(12) United States Patent
Suino

(10) Patent No.: US 7,369,713 B2
(45) Date of Patent: May 6, 2008

(54) IMAGE PROCESSING APPARATUS AND METHOD FOR DETERMINING WHETHER AN IMAGE IS OF A VERTICAL OR HORIZONTAL WRITING

(75) Inventor: Tooru Suino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/777,056

(22) Filed: Jul. 12, 2007

(65) Prior Publication Data

US 2007/0258660 A1    Nov. 8, 2007

Related U.S. Application Data

(62) Division of application No. 10/409,123, filed on Apr. 9, 2003, now Pat. No. 7,277,596.

(30) Foreign Application Priority Data

Apr. 10, 2002    (JP)    ............................ 2002-108019
Jul. 9, 2002    (JP)    ............................ 2002-199761

(51) Int. Cl.
G06K 9/36    (2006.01)
G06K 9/34    (2006.01)
H04N 1/40    (2006.01)

(52) U.S. Cl. .................... 382/290; 382/176; 358/462

(58) Field of Classification Search ............... 382/173, 382/176, 177, 185, 290, 297; 358/462
See application file for complete search history.

(56) References Cited

U.S. PATENT DOCUMENTS 5,832,137 A    11/1998   Knox 6,195,459 B1 *    2/2001   Zhu ............................ 382/176
6,650,773 B1    11/2003   Maurer et al.

FOREIGN PATENT DOCUMENTS

| JP | 5-48835 | 2/1993 |
|---|---|---|
| JP | 5-89284 | 4/1993 |
| JP | 6-152884 | 5/1994 |
| JP | 6-245003 | 9/1994 |
| JP | 7-87295 | 3/1995 |
| JP | 8-242336 | 9/1996 |
| JP | 10-229484 | 8/1998 |
| JP | 11-187266 | 7/1999 |

OTHER PUBLICATIONS

N. Jin and Y.Y. Tang, "Text area localization under complex-background using wavelet decomposition," Proc. Sixth International Conference on Document Analysis and Recognition, pp. 1126-1130, Sep. 2001.*

(Continued)

*Primary Examiner*—Colin LaRose
(74) *Attorney, Agent, or Firm*—Oblon, Spivak, McClelland, Maier & Neustadt, P.C.

(57) ABSTRACT

An image processing apparatus, including a transform unit configured to wavelet-transform image data into a set of wavelet coefficients, and a determination unit configured to determine whether the image data is of a vertical writing or of a horizontal writing based on the set of wavelet coefficients.

6 Claims, 21 Drawing Sheets

OTHER PUBLICATIONS

W. Mao, F. Chung, K. Lanm, and W.C. Siu, "Hybrid Chinese/English text detection in images and video frames,", Proc. Internal Conference on Pattern Recognition (ICPE'02), pp. 1015-1018, Aug. 2002.*

J. Li and R. Gray, Text and Picture Segmentation by the Distribution Analysis of Wavelet Coefficients. In Proceeding of International Conference on Image Processing, Oct. 1998, pp. 790-794.*

Sin, B., Kim, S. and Cho, B., Locating characters in scene images using frequency features. In: Proceedings of the 16th International Conference on Pattern Recognition (ICPR'02), pp. 489-492.*

H. Li, D. Doermann and O. Kia, "Automatic Text Detection and Tracking in Digital Video", IEEE Transactions on Image Processing, vol. 1, No. 1, (2000) 147-156.*

* cited by examiner

DECOMPOSITION_LEVEL_0

DECOMPOSITION_LEVEL_1

DECOMPOSITION_LEVEL_2

DECOMPOSITION_LEVEL_3

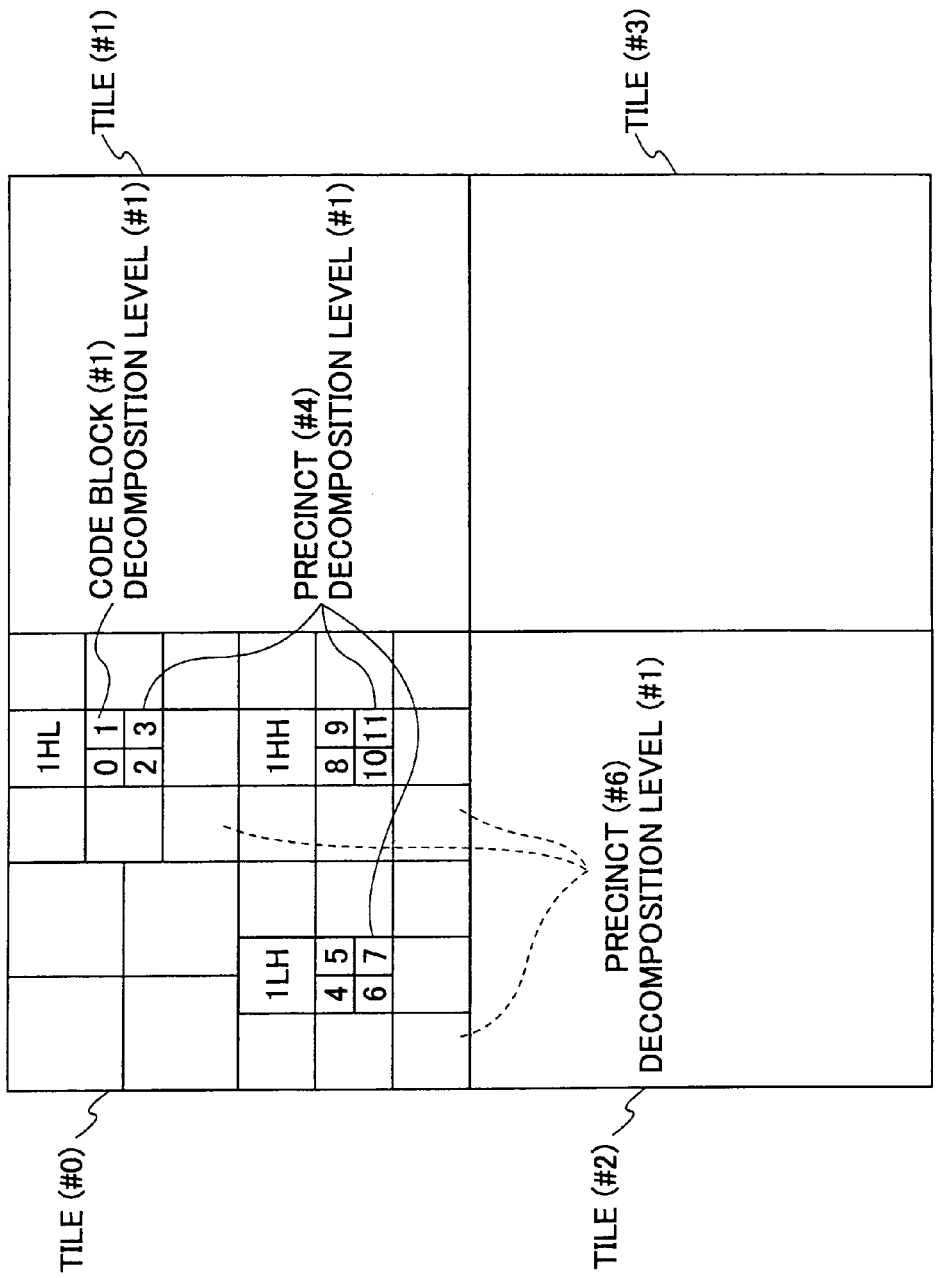

DECOMPOSITION LEVEL 1

3LH COEFFICIENT

A>36&B>36&C>36&D>36&E>36 → HORIZONTAL WRITING PATTERN
A<-36&B<-36&C<-36&D<-36&E<-36 → HORIZONTAL WRITING PATTERN

IMAGE PROCESSING APPARATUS AND METHOD FOR DETERMINING WHETHER AN IMAGE IS OF A VERTICAL OR HORIZONTAL WRITING

CROSS-REFERENCE TO RELATED APPLICATIONS

This is a Divisional application of U.S. Ser. No. 10/409,123, filed Apr. 9, 2003 now U.S. Pat. No. 7,277,596, and is based upon and claims the benefit of priority from prior Japanese Patent Application Nos. 2002-108019, filed Apr. 10, 2002, and 2002-199761, filed Jul. 9, 2002, the entire contents of each of which are incorporated herein by reference.

BACKGROUND OF THE INVENTION

1. Field of the Invention

The present invention generally relates to image input apparatuses that correctly determine a sending face (face of a document having information to be sent thereon) or a printing side, and eliminate show-through (bleed-through, images on the back face of a document that show through in the front face), and to image processing apparatuses, image processing methods, image processing programs and storage media storing the image processing programs that perform compression and decompression of image data, and more particularly, to a technique suitable for image processing apparatuses, such as facsimile machines (FAX), scanners, digital copying machines, and printing machines (printers). The present invention may be applied to machines that handle images such as mobile phones, digital cameras, browsers for the Internet, machines for medical use, and machines for satellite communication, and to various application programs, device drivers such as printer drivers, and the like.

2. Description of the Related Art

Conventionally, in facsimile machines, digital copying machines (with ADF), and printers to which papers are manually fed, in many cases, it is difficult to understand whether the sending face or printing side should be up or down. Thus, when using a facsimile apparatus, for example, there is a case where unnecessary trouble and cost occur because the wrong side of an original is sent and the original must be sent again.

Accordingly, in order to eliminate such a problem, there is proposed an image reading apparatus that reads the front face of an original, automatically reverses the original so as to read the back face when the front face is determined to be blank (white), and performs compression and transmission, for example (refer to Japanese Laid-Open Patent Application No. 05-48835).

In addition, there is also an apparatus that reads the front face and the back face with a scanner and determines whether or not the front face or back face is the printing side based on the amount of data of a compressed image (refer to Japanese Laid-Open Patent Application No. 06-245003).

In the image reading apparatus of the former example, however, the side that should not be printed is limited to blank. Thus, when an original is black paper or paper of a brown-colored variety, for example, it is impossible to determine the printing side. Also, with lossy compression by such as the apparatus of the following example, it is difficult to determine the printing side only from the amount of data.

Incidentally, with the progress in image input/output techniques, the demand for higher definition images has increased in recent years. Taking a digital camera as an example of image input apparatuses, price-reduction of high performance charge-coupled devices, having three million or more pixels, advances and such charge-coupled devices are widely used in products of popular price. In addition, regarding technical fields of image output apparatuses and image display apparatuses, achievements in higher-definition and price-reduction in hard copy fields, such as laser printers and ink jet printers, are remarkable. Soft copy fields such as CRTs and LCDs are not exceptions to such phenomena.

The marketing of such high-definition and inexpensive image input/output apparatuses is causing an increase in popularity of high-definition images. In the future, it is expected that the demand for high-definition images will continue to increase in various fields.

Against the background as described above, it is conceived that the demand for compression and decompression techniques capable of easily handling high-definition images will become higher and higher from now on. Thus, conventionally, there is, as one of image compression techniques satisfying the demand, the technique of JPEG 2000 that can process high-definition images by dividing the images into small units and even decode the images of high compression rates with high quality.

As for the type of usage of JPEG 2000, from the characteristics of the data structure, it is conceivable that a server will store compressed images in a network environment, such as the Internet and a server/client system, and the server provides a user or client with all or a part of compressed images in accordance with a request from the user or client.

Considering such type of usage of JPEG 2000 in the network environment, however, it is assumed that the server compresses a large quantity of image data and manages the image data after the compression. In this case, it is anticipated that the server makes mistakes in recognizing the aspects of the images in not just a few cases. Hence, when a user of the Internet or a client in a server/client system accesses image data stored in the server with wrong aspects, of course, there are inconveniences that the aspect of the image output on a display and that of the image output from a printer, for example, are wrong and inappropriate, since the aspects of the image data obtained from the server are also wrong. Such inconveniences are problems to be solved at all cost in terms of difficulty in reading, especially when the image data are based on text images.

It is conceived as the clue for solving the above-described problems to determine whether text images are of vertical writing or horizontal writing. The determination techniques of vertical writing and horizontal writing include techniques described in Japanese Laid-Open Patent Applications No. 05-089284 and No. 08-242336, for example. Japanese Laid-Open Patent Application No. 05-089284 describes the technique of projecting an input image in x-direction and y-direction and performing one-dimensional Fourier transformation for each so as to determine whether the image is of vertical writing or horizontal writing from the size of power spectrum. In addition, Japanese Laid-Open Patent Application No. 08-242336 describes the technique of determining the aspect of an original by using document analysis functions of OCR.

As described above, it is conceived, as the clue for solving the problems of error in determining the aspect of image data, to determine whether text images behind the image data are of vertical writing or horizontal writing. Such determination techniques include the techniques in the above-described applications. In the techniques described in the applications, however, heavy functions (requiring large amounts of computer resources) are required such as one-dimensional Fourier transformation functions and OCR functions so as to determine the aspects of characters and originals. Accordingly, the weight (amounts of computer resource requirements) of such heavy functions becomes a constraint on the practical use of the above-described techniques in a network environment such as the Internet and a server/client system.

SUMMARY OF THE INVENTION

It is a general object of the present invention to provide an improved and useful image input apparatus, image processing apparatus, image processing method, image processing program, and storage medium storing the image processing program in which the above-mentioned problems are eliminated.

It is another and more specific object of the present invention to provide an image input apparatus capable of correctly determining a sending face (face of a document having information to be sent thereon) or a printing side.

It is still another object of the present invention to provide an image input apparatus capable of reducing communication cost to a low level by eliminating show-through (bleed-through, images on the back face of a document that show through in the front face) and removing needless noise so as to reduce the amount of coded data after compression in a lossless compression method.

It is yet another object of the present invention to provide an image input apparatus capable of definitely processing a sending face or a printing side even when it is difficult to recognize the sending face or printing side of an original through selecting, by a user, whether or not to automatically (by default) perform determination of whether the sending face or printing side is the front face, back face, or both faces.

It is a further object of the present invention to make it possible to determine whether a text image included in image data is of vertical writing or horizontal writing without adding a heavy function (requiring large amounts of computer resources) in a compression/decompression process of the image data.

In order to achieve the above-mentioned objects, according to one aspect of the present invention, there is provided an image input apparatus that includes:

a show-through elimination part performing show-through elimination on image data read from the front face of an original and image data read from the back face of the original; and an image compression part compressing and converting, into codes, the image data of the front face and the back face from which image data show-through is eliminated, the show-through elimination part using the image data of the back face when performing the show-through elimination on the image data of the front face and using the image data of the front face when performing the show-through elimination on the image data of the back face.

In the present invention, compression and decompression are performed by reading the printing side or the sending side. However, the side that should not be printed may be other than blank (white). For example, an original may be black paper or paper of a brown-colored variety such as rough paper.

Also, in the present invention, whether or not a side of an original is the printing side is determined by the amount of data of lossless compression or the absolute value of a coefficient after wavelet transformation.

Additionally, in the present invention, it is possible to perform correct determination since whether or not a side of an original is the printing side is determined by the amount of data of codes after compression only in the case of a lossless compression method. Also, the determination of the printing side is made by the absolute value of a coefficient of a high-frequency component after orthogonal transformation. Thus, it is possible to correctly determine the printing side even in the case of a lossy compression method if the compression method uses orthogonal transformation (such as JPEG 2000), for example.

According to the present invention, it is possible to reduce the amount of codes in the case of lossless compression by performing the show-through elimination on both front face and back face. Thus, when transferring image data, it is possible to improve the transfer speed and also reduce the transfer cost.

In addition, since the sending face or the printing side is automatically determined, it is unnecessary to print or transfer an original again after printing or transferring the original in a wrong way. Accordingly, there is no waste of time and cost.

Further, in the case of an original with a confusing sending face or printing side, the user can manually select the sending face or the printing side. Thus, it is possible to correctly print or transmit any original.

Additionally, according to another aspect of the present invention, there is provided an image processing apparatus compressing image data by following the procedure of conversion into two-dimensional wavelet coefficients, quantization, and coding, the image processing apparatus including:

a determination part determining whether a text image that is the original of the image data is of vertical writing or horizontal writing based on the characteristics of coefficients in one of the vertical direction and the horizontal direction included in the two-dimensional wavelet coefficients.

Accordingly, it is possible to determine whether a text image included in image data is of vertical writing or horizontal writing without adding a heavy function in a compression process of the image data.

In addition, according to another aspect of the present invention, there is also provided an image processing apparatus decompressing, by the inverse procedure, image data compressed by following the procedure of conversion into two-dimensional wavelet coefficients, quantization, and coding, the image processing apparatus including:

a determination part determining whether or not a text image that is the original of the image data is of vertical writing or horizontal writing based on the characteristics of coefficients in one of the vertical direction and the horizontal direction included in the two-dimensional wavelet coefficients.

Accordingly, it is determined whether a text image included in image data is of vertical writing or horizontal writing without adding a heavy function in a compression process of the image data.

Further, in each of the above-described image processing apparatuses, the two-dimensional wavelet coefficients after the conversion form an n-layer hierarchy.

Accordingly, in a compression/decompression process of image data, without adding a heavy function, it is possible to determine whether a text image that is the original of image data is of vertical writing or horizontal writing based on the characteristics of coefficients in one of the vertical direction and the horizontal direction included in the two-dimensional wavelet coefficients in a layer in the n-layer hierarchy.

In addition, the determination part may determine whether or not the text image that is the original of the image data is of vertical writing or horizontal writing by using a top layer in the n-layer hierarchy, and when the determination cannot be made, successively use lower layers for the determination.

Accordingly, it is possible to obtain reliability of the determination.

Also, the determination part may determine whether the text image that is the original of the image data is of vertical writing or horizontal writing based on the characteristics of coefficients in one of a subband HL and a subband LH included in a layer in the n-layer hierarchy.

Accordingly, it is possible to obtain a good determination.

Additionally, the determination part may determine whether the text image that is the original of the image data is of vertical writing or horizontal writing based on the characteristics of coefficients of a subband HL included in the two-dimensional wavelet coefficients.

In addition, the determination part may determine the text image that is the original of the image data to be of vertical writing, when, regarding the coefficients of a subband HL, the sum of patterns where a predetermined number of the coefficients, each being greater than a predetermined positive value, are successively arranged in the vertical direction and patterns where the predetermined number of the coefficients, each being less than a predetermined negative value, are successively arranged in the vertical direction, is greater than a predetermined value.

Further, the determination part may determine whether the text image that is the original of the imaged data is of vertical writing or horizontal writing based on the characteristics of coefficients of a subband LH included in the two-dimensional wavelet coefficients.

Also, the determination part may determine that the text image that is the original of the image data is in horizontal writing, when, regarding coefficients of a subband LH, the sum of patterns where a predetermined number of the coefficients, each being greater than a predetermined positive value, are successively arranged in a horizontal direction and patterns where the predetermined number of the coefficients, each being less than a predetermined negative value, are successively arranged in the horizontal direction, is greater than a predetermined value.

Accordingly, it is possible to obtain a good determination.

Additionally, the image processing apparatus may further include an image rotating part rotating and outputting the image data in accordance with the determination by the determination part.

Accordingly, when the angle of image data is wrong, it is possible to automatically correct the angle.

Further, according to another aspect of the present invention, there is also provided an image processing method of compressing image data by following a procedure of conversion into two-dimensional wavelet coefficients, quantization, and coding, comprising the step of:

determining whether a text image that is the original of the image data is of vertical writing or horizontal writing based on the characteristics of coefficients in one of the vertical direction and the horizontal direction included in the two-dimensional wavelet coefficients.

Accordingly, it is possible to determine whether a text image included in image data is of vertical writing or horizontal writing without adding a heavy function in a compression process of the image data.

Also, according to another aspect of the present invention, there is also provided an image processing method of decompressing, by the inverse procedure, image data compressed by following the procedure of conversion into two-dimensional wavelet coefficients, quantization, and coding, comprising the step of:

determining whether a text image that is the original of the image data is of vertical writing or horizontal writing based on the characteristics of coefficients in one of the vertical direction and the horizontal direction included in the two-dimensional wavelet coefficients.

Accordingly, it is possible to determine whether a text image included in image data is of vertical writing or horizontal writing without adding a heavy function in a compression process of the image data.

Further, according to another aspect of the present invention, there is also provided an image processing program installed in a computer and causing the computer to carry out a function of compressing image data by following the procedure of conversion into two-dimensional wavelet coefficients, quantization, and coding, the image processing program including the instruction of:

causing the computer to carry out a determination function of determining whether a text image that is the original of the image data is of vertical writing or horizontal writing based on the characteristics of coefficients in one of the vertical direction and the horizontal direction included in the two-dimensional wavelet coefficients.

Accordingly, it is possible to determine whether a text image included in image data is of vertical writing or horizontal writing without adding a heavy function in a compression process of the image data.

In addition, according to another aspect of the present invention, there is also provided an image processing program installed in a computer and causing the computer to carry out a function of decompressing, by the inverse procedure, image data compressed by following the procedure of conversion into two-dimensional wavelet coefficients, quantization, and coding, the image processing program comprising the instruction of:

causing the computer to carry out a determination function of determining whether a text image that is the original of the image data is of vertical writing or horizontal writing based on the characteristics of coefficients in one of the vertical direction and the horizontal direction included in the two-dimensional wavelet coefficients.

Accordingly, it is possible to determine whether a text image included in image data is of vertical writing or horizontal writing without adding a heavy function in a compression process of the image data.

Additionally, the two-dimensional wavelet coefficients after the conversion may form an n-layer hierarchy.

Accordingly, it is possible to determine whether a text image that is the original of image data is of vertical writing or horizontal writing based on the characteristics of coefficients in one of the vertical direction and the horizontal direction included in the two-dimensional wavelet coefficients in a layer of the n-layer hierarchy.

In addition, the determination function may determine whether the text image that is the original of the image data is of vertical writing or horizontal writing by using the top layer in the n-layer hierarchy, and when the determination cannot be made, successively use lower layers for the determination.

Accordingly, it is possible to obtain the reliability of the determination.

Further, the determination function may determine whether the text image that is the original of the image data is of vertical writing or horizontal writing based on the characteristics of coefficients in one of a subband HL and a subband LH included in a layer in the n-layer hierarchy.

Accordingly, it is possible to obtain a good determination.

Additionally, the determination function may determine whether the text image that is the original of the image data is of vertical writing or horizontal writing based on the characteristics of coefficients of a subband HL included in the two-dimensional wavelet coefficients.

In addition, regarding the coefficients of the subband HL, the determination function may determine that the text image that is the original of the image data is of vertical writing, when the sum of patterns where a predetermined number of the coefficients, each being greater than a predetermined positive value, are successively arranged in the vertical direction and patterns where the predetermined number of the coefficients, each being less than a predetermined negative value, are successively arranged in the vertical direction, is greater than a predetermined value.

Additionally, the determination function may determine whether the text image that is the original of the image data is of vertical writing or horizontal writing based on the characteristics of coefficients of a subband LH included in the two-dimensional wavelet coefficients.

In addition, regarding the coefficients of the subband LH, the determination function may determine that the text image that is the original of the image data is in horizontal writing, when the sum of patterns where a predetermined number of the coefficients, each being greater than a predetermined positive value, are successively arranged in the horizontal direction and patterns where the predetermined number of the coefficients, each being less than a predetermined negative value, are successively arranged in the horizontal direction, is greater than a predetermined value.

Accordingly, it is possible to obtain a good determination.

Further, each of the image processing programs may further include the instruction of:

causing the computer to carry out an image rotation function of rotating and outputting the image data in accordance with the determination by the determination function.

Accordingly, when the angle of image data is wrong, it is possible to automatically correct the angle.

Additionally, according to another aspect of the present invention, there is also provided a storage medium storing the image processing program as described above.

Accordingly, it is possible to record and store such an image processing program. Thus, it is possible to let the image processing program achieve portability, depending on the form of the storage medium.

Other objects, features and advantages of the present invention will become more apparent from the following detailed description when read in conjunction with the following drawings.

BRIEF DESCRIPTION OF THE DRAWINGS

FIG. 17 is a schematic diagram showing an example of precincts;

DETAILED DESCRIPTION OF THE PREFERRED EMBODIMENTS

A description will be given of embodiments of the present invention, with reference to the drawings.

First Embodiment

Figure 1:
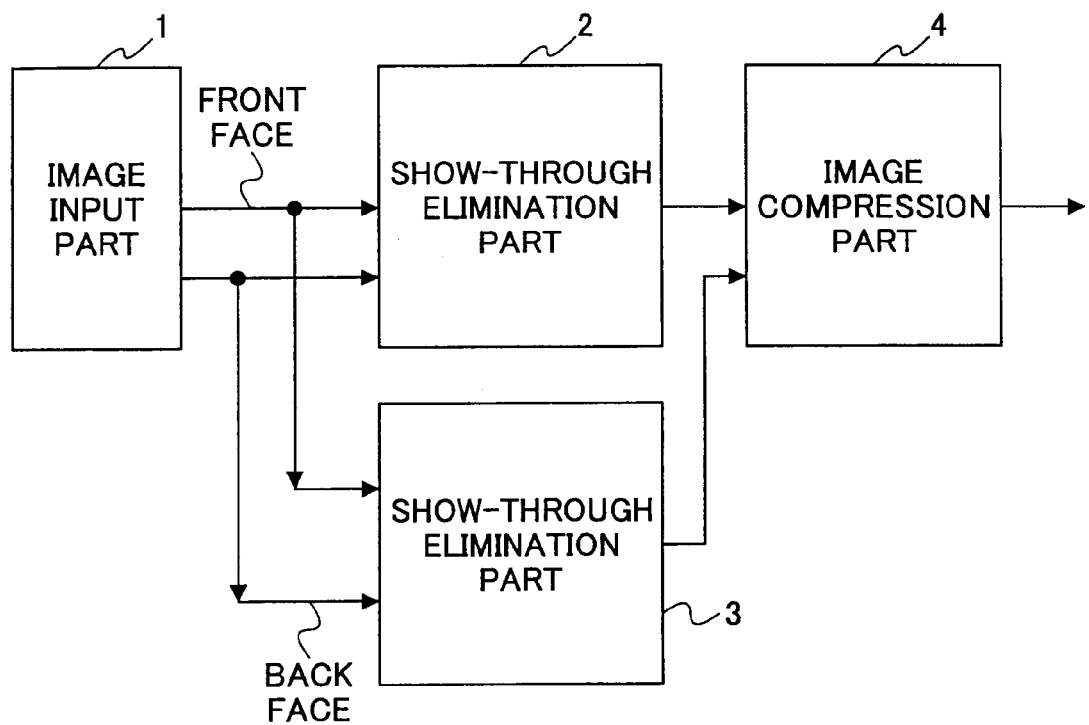
FIG. 1 is a block diagram showing the general structure of first through third embodiments of the present invention.

FIG. 1 shows the general construction of a first embodiment of the present invention. In an image input part 1, the front face and the back face of an original are input and converted into digital image data (8 bits for each pixel, for example). A show-through elimination part 2 eliminates show-through (bleed-through, images on the back face of a document that show through in the front face) of the front face. A show-through elimination part 3 eliminates show-through of the back face. In an image compression part 4, image data from which show-through is eliminated are input, and image data of the front face and the back face are compressed.

Figure 2:
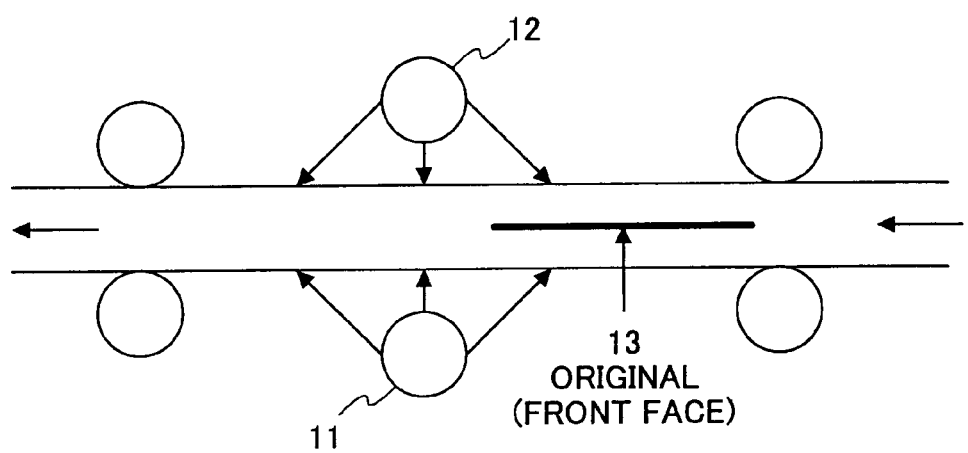
FIG. 2 is a schematic diagram showing the construction of an image input part according to the first and second embodiments.

FIG. 2 shows the construction of the image input part. Reading sensors 11 and 12 are provided up and down from an original carrying path of an original 13. The reading sensor 11 reads and converts the front face of the original 13 into image data. The reading sensor 12 reads and converts the back face of the original 13 into image data.

Figure 3:
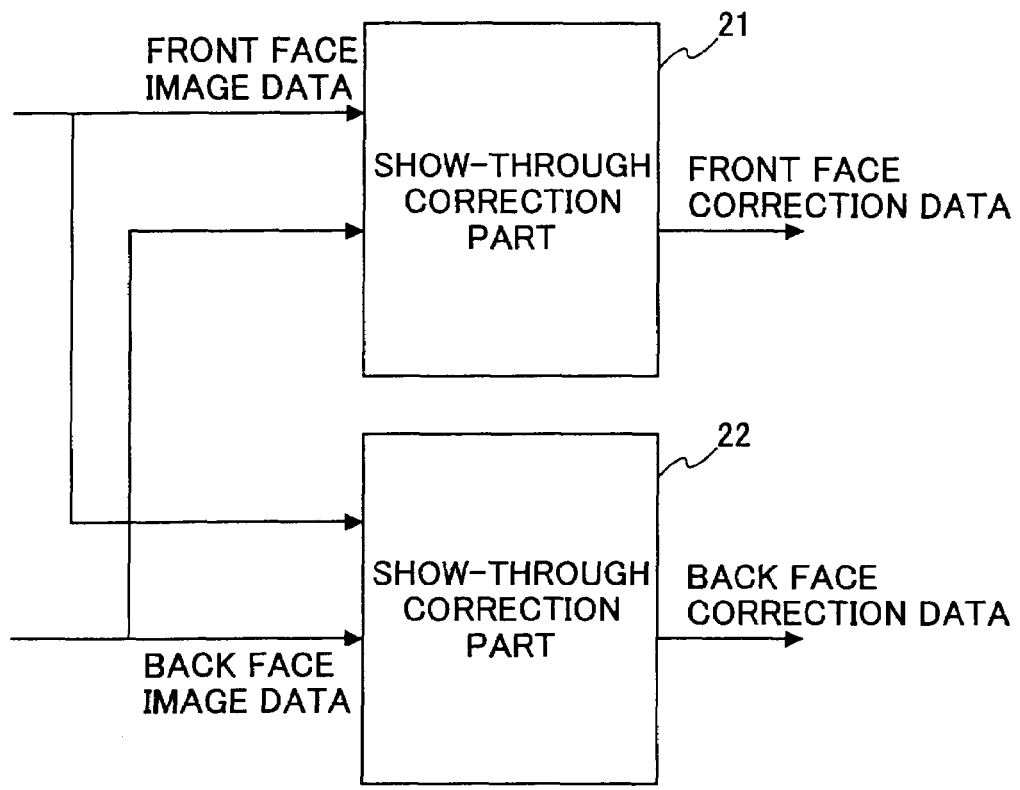
FIG. 3 is a schematic diagram showing the construction of a show-through elimination part.

FIG. 3 shows the construction of the show-through elimination part. A show-through correcting part 21 that eliminates show-through of the front face performs show-through elimination using image data of both the front face and the back face. A show-through correcting part 22 that eliminates show-through of the back face performs show-through elimination using image data of both the back face and the front face.

Figure 4:
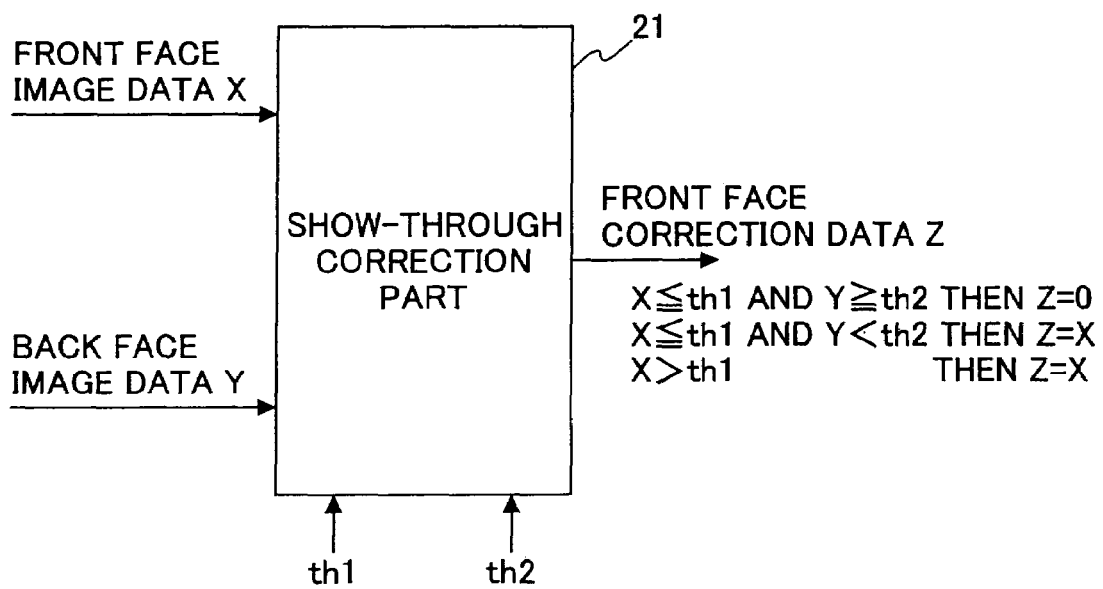
FIG. 4 is a schematic diagram for specifically explaining show-through elimination of the front face.

FIG. 4 is a diagram for specifically explaining the show-through elimination of the front face. In this embodiment, it is assumed that 8 bits represent one pixel, the concentration of white is 0, and the concentration of black is 255. The number of bits per pixel may be another value.

Suppose X is the concentration of the image data of the front face, Y is the concentration of the image data of the back face, and Z is the concentration of the image data after the front face correction. When the concentration of the image data of the front face is equal to or less than a threshold value th1, and the concentration of the image data of the back face in the same position is equal to or more than a threshold value th2, it is determined that a pixel X of the front face is influenced by show-through, and the concentration Z of the image data after the front face correction is set to 0, for example. Here, Z is set to 0 as an example, and Z may also be $Z=X-\alpha Y$ by setting $\alpha$ (a positive actual number less than 1).

When the concentration X of the image data of the front face is equal to or less than the threshold value th1, and the concentration Y of the image data of the back face in the same position is less than the threshold value th2, it is determined that the pixel X of the front face is not influenced by show-through, and Z is set to X (Z=X), for example.

In addition, when the concentration X of the image data of the front face is greater than the threshold value 1, it is determined that there is no influence of show-through, and Z is set to X (Z=X).

Figure 5:
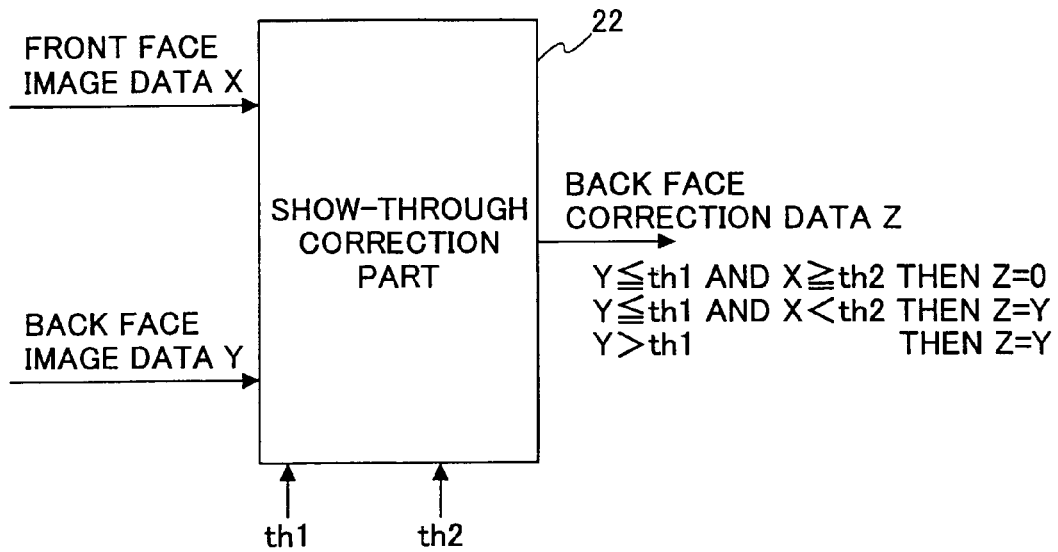
FIG. 5 is a schematic diagram for specifically explaining show-through elimination of the back face.

FIG. 5 is a diagram for specifically explaining the show-through elimination of the back face. In a case where Y is the concentration of the image data of the back face, X is the concentration of the image data of the front face, and Z is the concentration of the image data after the back face correction, when the concentration Y of the image data of the back face is equal to or less than the threshold value th1, and concentration X of the image data of the front face in the same position is equal to or more than th2, it is determined that a pixel Y of the back face is influenced by show-through, and the concentration Z of the image data after the back face correction is set to 0, for example. Here, Z is set to 0 as an example, and Z may be also set as $Z=Y-\alpha X$ by setting $\alpha$ (a positive actual number less than 1).

When the concentration Y of the image data of the back face is equal to or less than the threshold value th1, and the concentration X of the image data of the front face in the same position is less than the threshold value th2, it is determined that the pixel Y of the back face is not influenced by show-through, and Z is set to Y (Z=Y), for example.

Additionally, when the concentration Y of the image data of the back face is greater than the threshold value th1, it is determined that the pixel Y of the back face is not influenced by show-through, and Z is set to Y (Z=Y).

Figure 6:
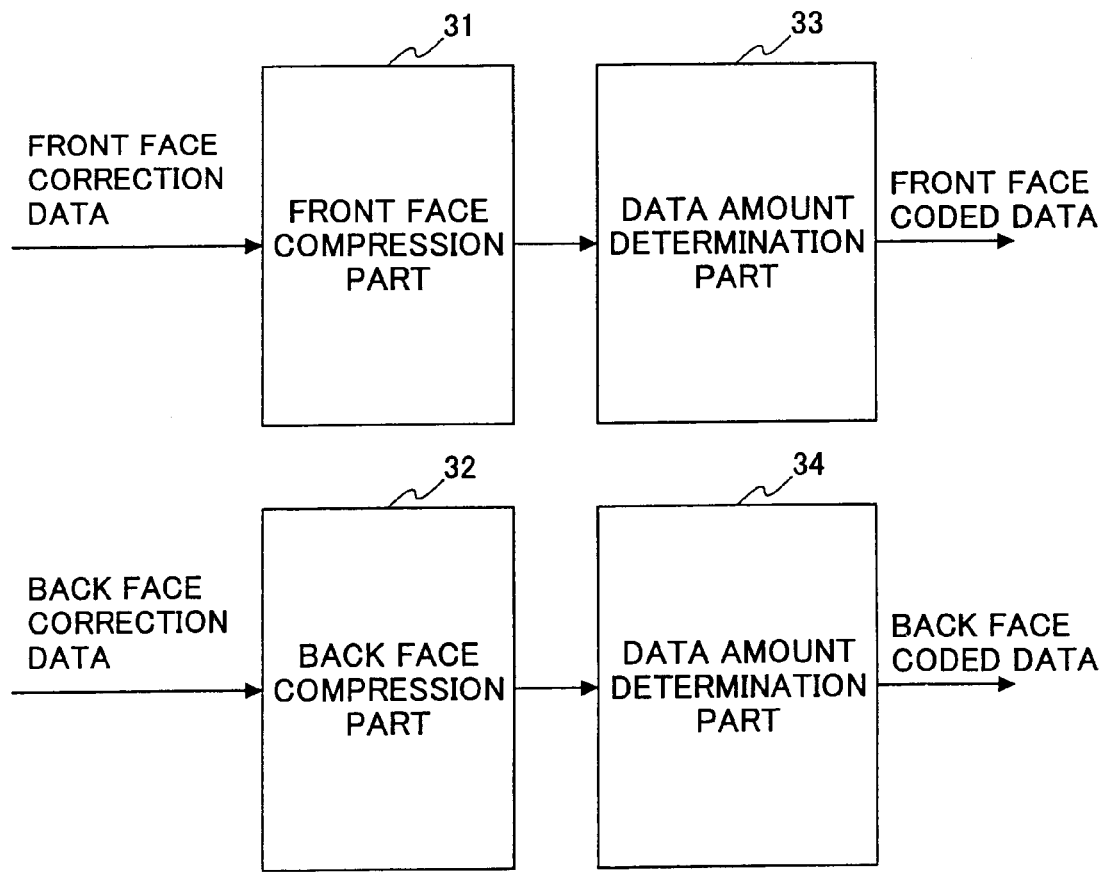
FIG. 6 is a schematic diagram showing an example of an image compression part that performs lossless compression.

FIG. 6 shows an example of the image compression part that performs lossless compression. A front face compression part 31 performs lossless compression on image data of the front face from which show-through is eliminated. A back face compression part 32 performs lossless compression on image data of the back face. "Lossless compression" refers to reversible image compression, that is, a compression method that maximizes compression rate within the reversible range.

Data amount determination parts 33 and 34 measure the amounts of data of the front face and the back face after compression, respectively. When the amount of data is equal to or less than a predetermined threshold value, it is determined that the face includes no information and the face is not the sending face (face of a document having information to be sent thereon) or the printing side. Only when the amount of data is greater than the predetermined threshold value, it is determined that the face includes information with meaning and the face is the sending face or the printing side.

In the above, the description is given by taking as an example the process for images read from both sides of an original. The present invention, however, may also be applied to data read from one side of an original. In this case, the process may be performed, for example, in the following steps: image reading→background elimination→image coding (compression)→determine by amount of codes.

Second Embodiment

The general construction, image input part and show-through elimination part in a second embodiment are the same as those in the first embodiment. The second embodiment is different from the first embodiment in the image compression part.

Figure 7:
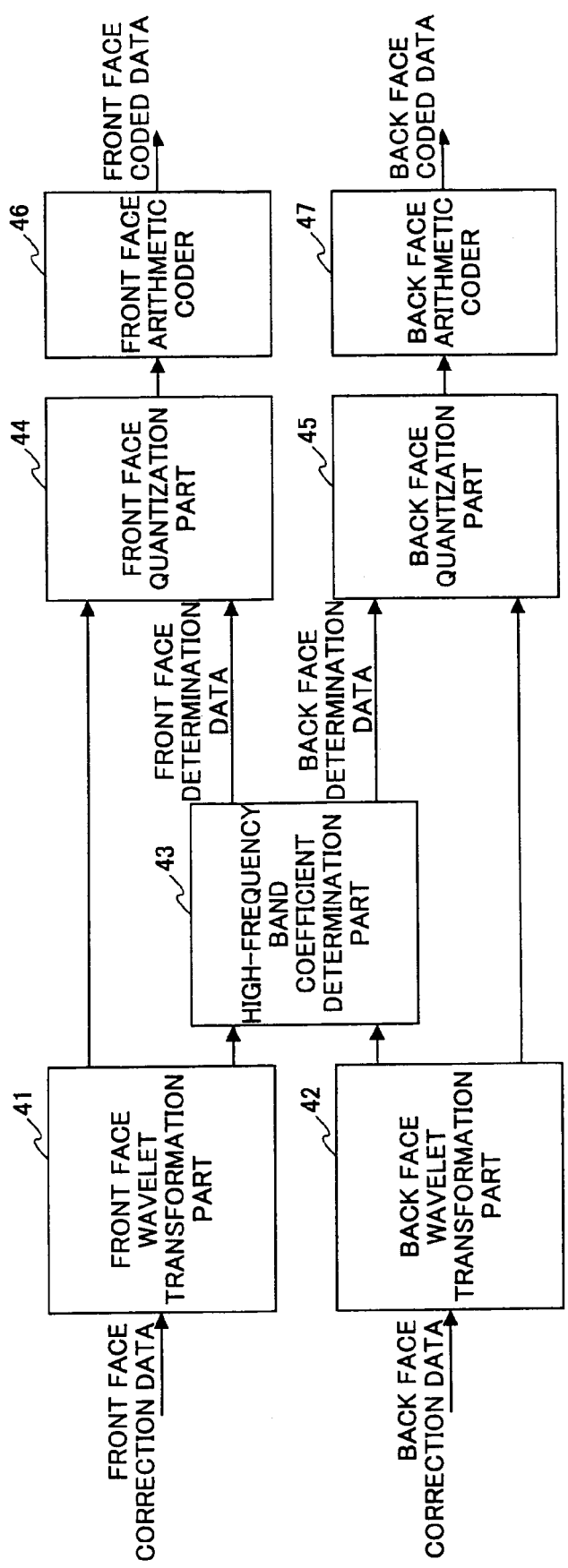
FIG. 7 is a block diagram showing an example of the image compression part for JPEG 2000.

FIG. 7 shows an example of the image compression part for JPEG 2000. JPEG 2000 is an example, and another compression method may also be used if the method uses orthogonal transformation such as DCT and Hadamar transformation. Here, a description will be given by taking JPEG 2000 as an example.

A front face wavelet transformation part 41 and a back face wavelet transformation part 42 perform wavelet transformation on the image data of the front face and the back face, respectively. A high-frequency band coefficient determination part 43 compares the absolute values of coefficients of high-frequency components with a predetermined threshold value th. When the absolute values are equal to or less than the threshold value th with a rate (95%, for example) close to all (100%), the high-frequency band coefficient determination part 43 determines that the face includes no information and is not the sending face or the printing side. Otherwise, the high-frequency band coefficient determination part 43 determines that the face includes information and is the sending face or the printing side. When it is determined that the face includes information, quantization and coding are performed on the face after wavelet transformation so as to create compression-coded data. In this case, quantization for the data of the front face is performed by a front face quantization part 44, and quantization for the image of the back face is performed by a back face quantization part 45. In addition, coding for the data of the front face is performed by a front face arithmetic coder 46, and coding for the data of the back face is performed by a back face arithmetic coder 47.

The above description is about the process for images read from both sides of an original. However, as in the first embodiment, the second embodiment may also be applied to data read from one side of an original.

Third Embodiment

The general construction and show-through elimination part of a third embodiment are the same as those in the first embodiment. The image compression part of the third embodiment uses the method of the first embodiment or the second embodiment. The third embodiment is different from the first and second embodiments in the image input part.

Figure 8:
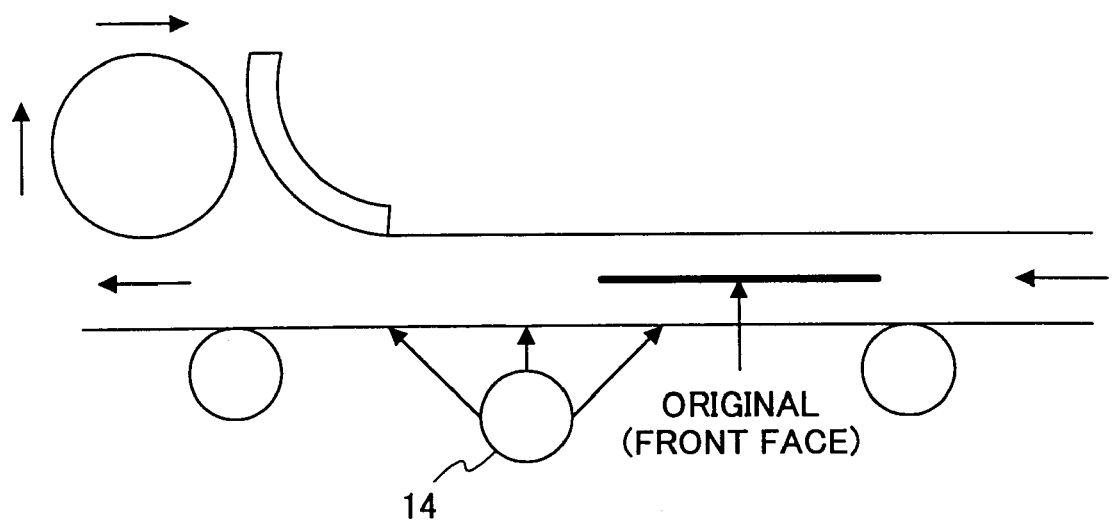
FIG. 8 is a schematic diagram showing an example of the image input part according to the third embodiment.

FIG. 8 shows an example of the image input part according to the third embodiment. In the image input part shown in FIG. 2, two reading sensors 11 and 12 are provided in the original carrying path. In the image input part shown in FIG. 8, however, only one reading sensor 14 is provided in the original carrying path.

Figure 9:
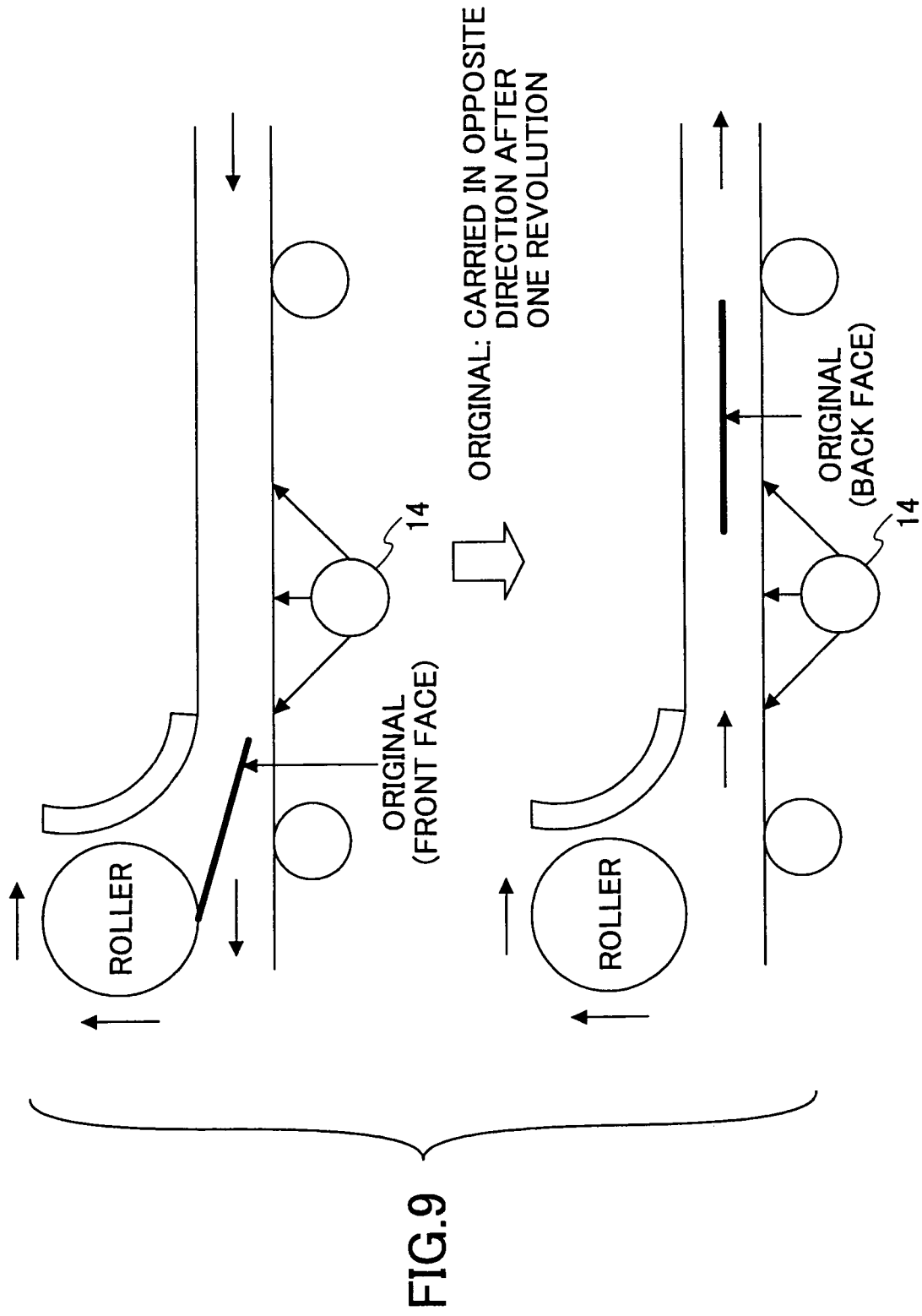
FIG. 9 is a schematic diagram showing a state where the back face of an original is read by the image input part according to the third embodiment.

FIG. 8 shows a state where the front face of an original is read. FIG. 9 shows a state where the back face of the original is read. In other words, first, in FIG. 8, the front face of the original is converted into read image data, then in FIG. 9, after reversing the original by feeding the original around a roller, the back face of the original, which is carried in the opposite direction of the original carrying path, is read by the reading sensor 14 and converted into image data.

Additionally, in FIGS. 8 and 9, the front face and the back face are automatically read and converted into image data. However, a user may manually turn over the original so that the front face and the back face are read and converted into image data.

Further, the above description is about the process for images read from both sides of an original. However, as in the first embodiment, the third embodiment may be also applied to data read from one side of an original.

Fourth Embodiment

Figure 10:
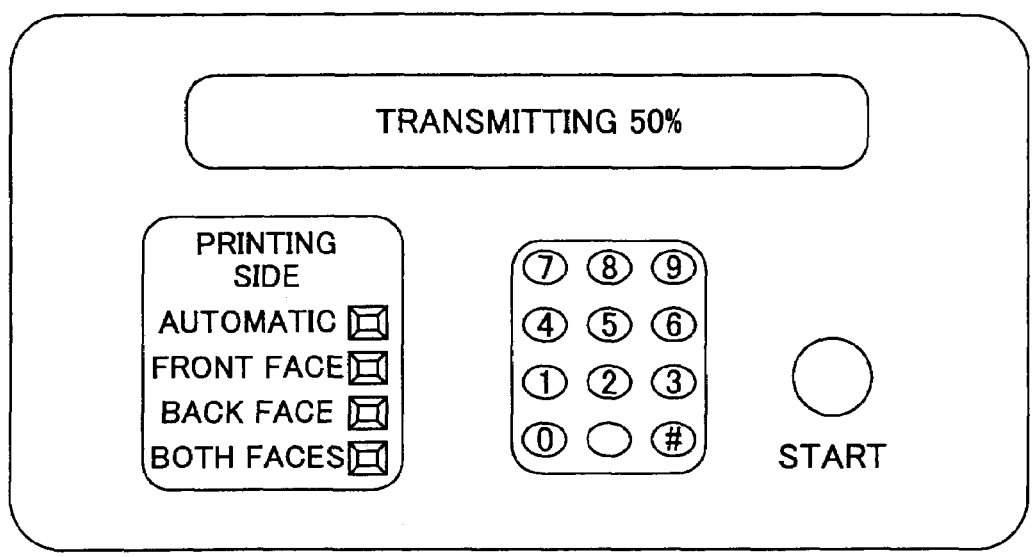
FIG. 10 is a schematic diagram showing an example of the operation panel of a facsimile machine (FAX)
Figure 11:
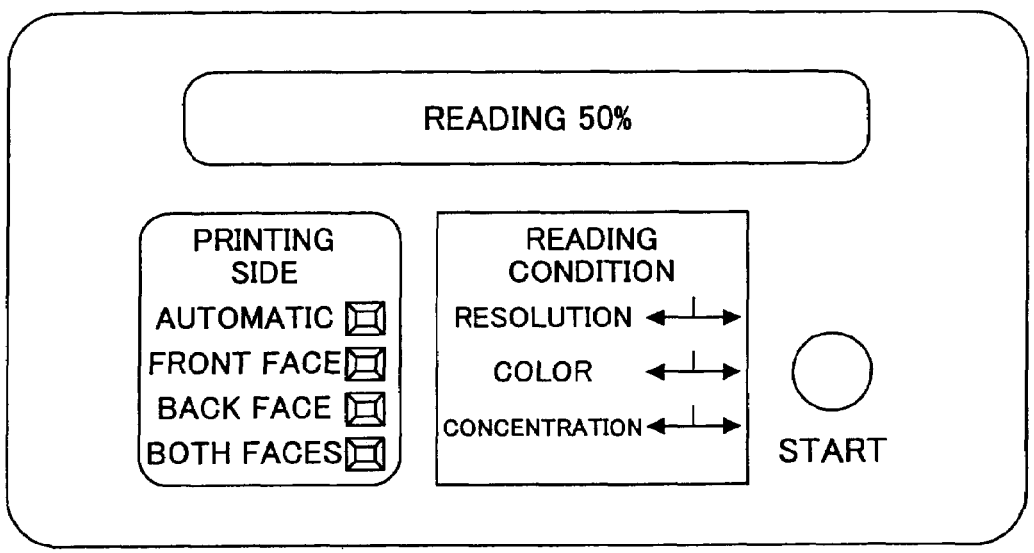
FIG. 11 is a schematic diagram showing an example of the operation panel of a scanner.
Figure 12:
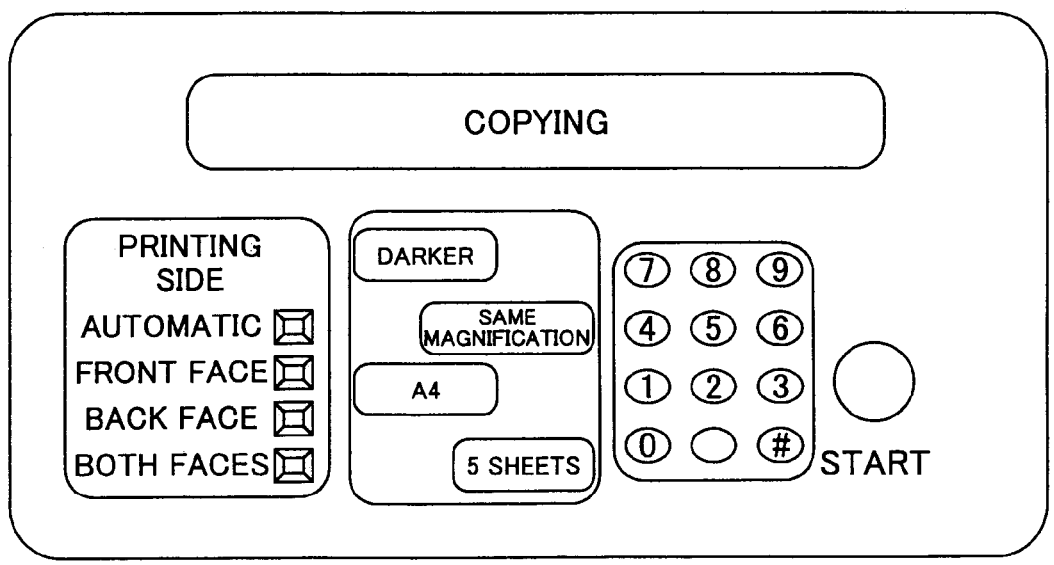
FIG. 12 is a schematic diagram showing an example of the operation panel of a copying machine.
Figure 13:
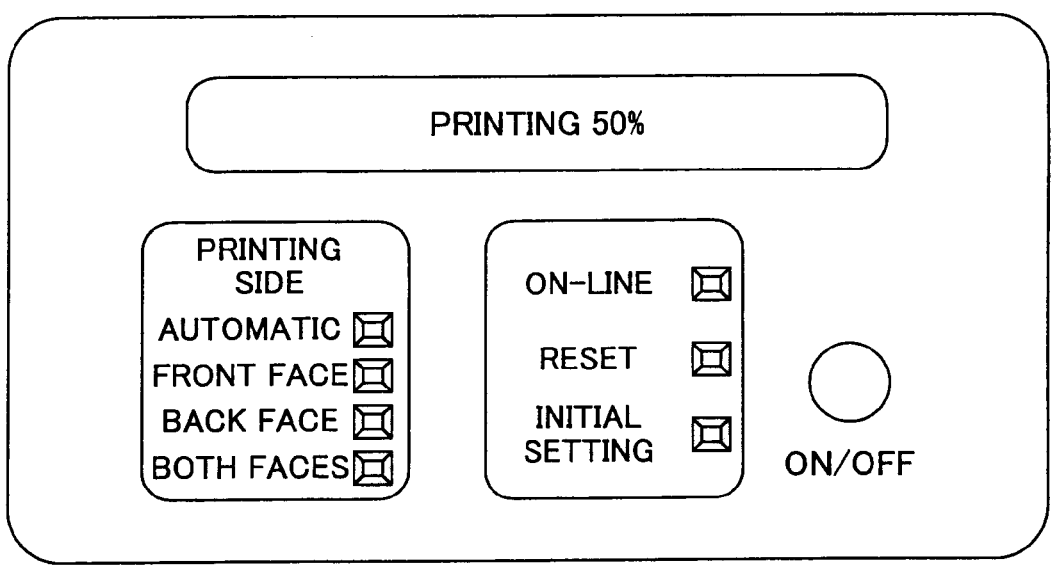
FIG. 13 is a schematic diagram showing an example of the operation panel of a printing machine (printer)

A fourth embodiment relates to operation panels in cases where the present invention is applied to various image processing apparatuses. That is, FIG. 10 shows an example of the operation panel of a facsimile machine (FAX), FIG. 11 shows an example of the operation panel of a scanner, FIG. 12 shows an example of the operation panel of a copying machine, and FIG. 13 shows an example of the operation panel of a printing machine (printer).

In the first through third embodiments described above, it is automatically determined which of the front face and the back face is the printing side or the sending face. However, the determination is difficult and there are also limitations. For example, there is a case where only one side of an original should be transmitted (processed) when both sides of the original include text.

Accordingly, as shown in FIGS. 10 through 13, the operation panels according to the fourth embodiment are provided with functions such as buttons allowing a user to select the sending face or the printing side. The user can designate through button selection which of "front face", "back face" and "both faces" should be the sending face or the printing side. Only when the user selects "automatic", the printing side or the sending face is automatically determined by using the methods of the first through third embodiment described above.

Hence, it is possible to perform transmission or printing that the user intends. However, since the "automatic" is preferable for the user in view of convenience, the setting is made to the "automatic" by default.

Referring to FIGS. 14 through 25, a description will be given of another embodiment of the present invention.

(General Explanation of JPEG 2000)

First, a general description will be given of JPEG 2000. JPEG 2000 is a method relating to compression/decompression of image data. Hardware resources are required for compressing/decompressing image data according to the method. As an example of such hardware resources, a computer that executes an image processing program may be used. That is, if the image processing program for compressing/decompressing image data according to the JPEG 2000 method is installed in the storage device of a computer, the HDD, for example, the computer interprets the image processing program by the basic architecture constructed by the CPU and memory and carries out an image compression process according to the JPEG 2000 method to an input image or decompresses image data that is compressed by the JPEG 2000 method. In this sense, the storage device of a computer, the HDD, for example, functions as a storage medium storing an image processing program. However, the storage medium storing the image processing program is not limited to the storage device of a computer. The storage medium may also be one of various portable recording media, such as various types of optical disks and flexible disks that record information optically or magnetically.

Figure 14:
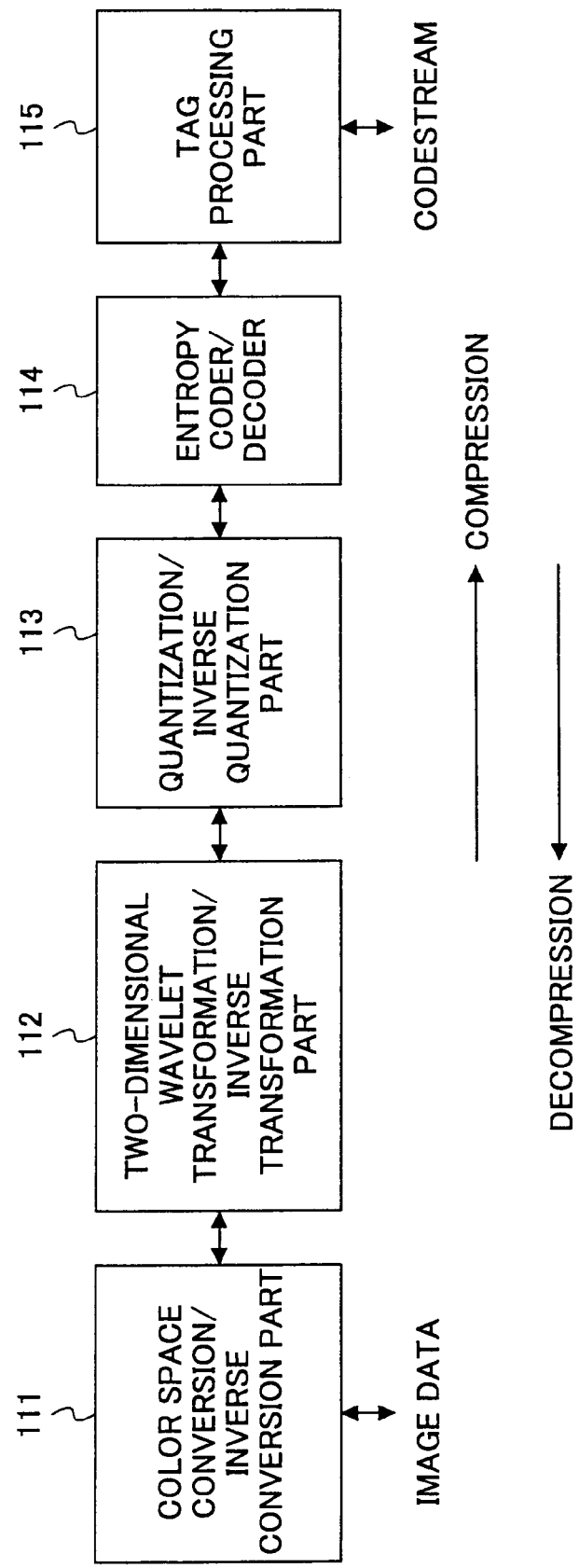
FIG. 14 is a block diagram for explaining the basics of the JPEG 2000 algorithm.

FIG. 14 is a block diagram for explaining the basics of the JPEG algorithm. The block diagram shows the algorithm corresponding to various functions carried out by a computer according to the image processing program for compressing/decompressing image data of the JPEG 2000 method in a blocked manner.

As shown in FIG. 14, the JPEG 2000 algorithm includes a color space conversion/inverse conversion part 111, a two-dimensional wavelet transformation/inverse transformation part 112, a quantization/inverse quantization part 113, an entropy coder/decoder 114, and a tag processing part 115. In the following, each of the parts will be explained.

Referring to FIGS. 15 and 16A through 16D, a description will be given of the color space conversion/inverse conversion part 111 and the two-dimensional wavelet transformation/inverse transformation part 112.

Figure 15:
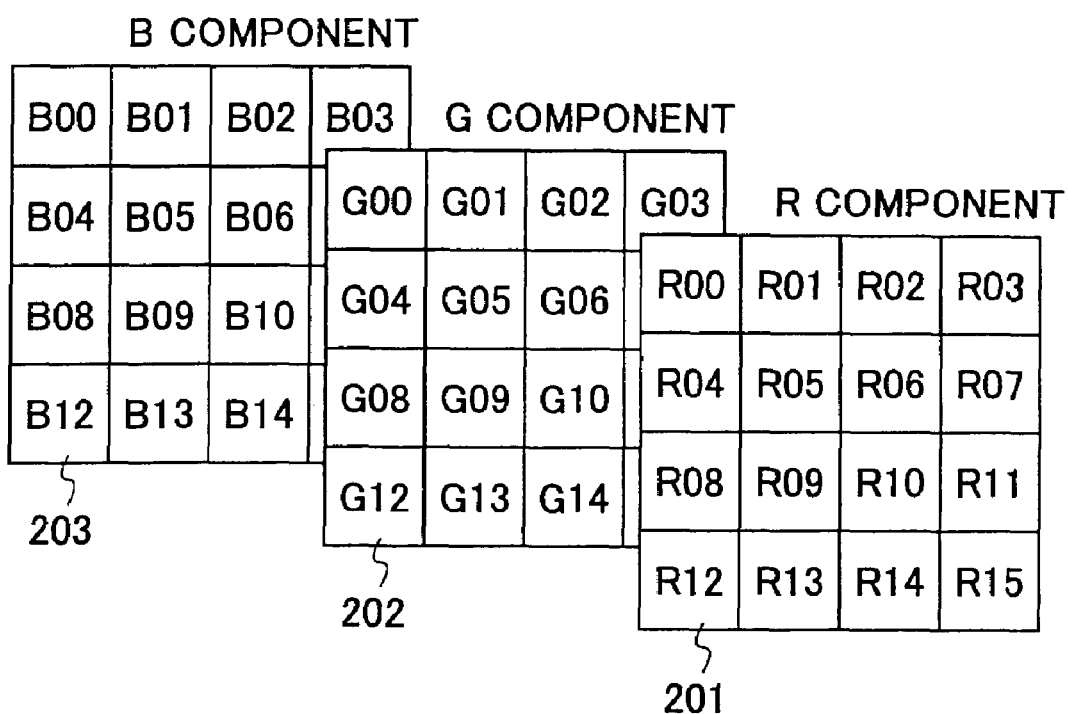
FIG. 15 is a schematic diagram showing an example of divided components of an original image that is a color image.
Figure 16A:
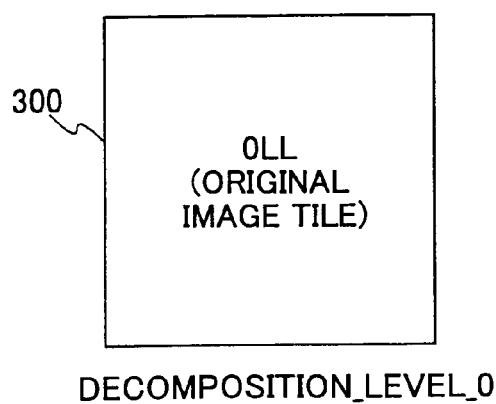
FIGS. 16A, 16B, 16C, and 16D are schematic diagrams showing subbands at respective decomposition levels when the number of the decomposition levels is three.
Figure 16B:
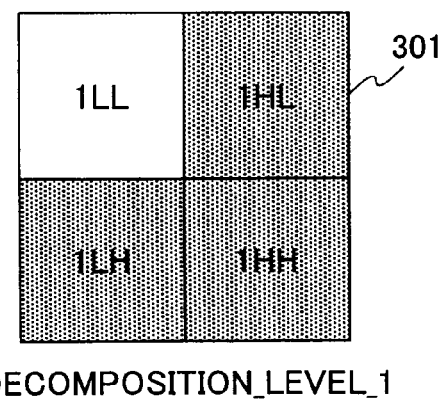
Figure 16C:
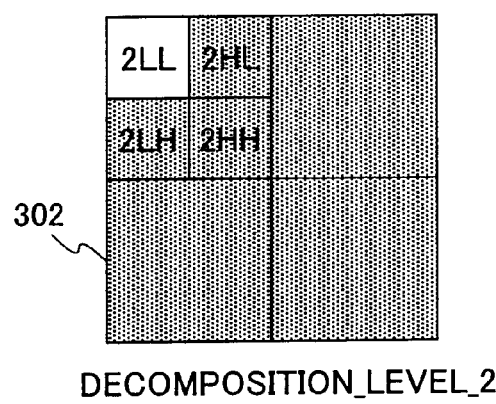
Figure 16D:
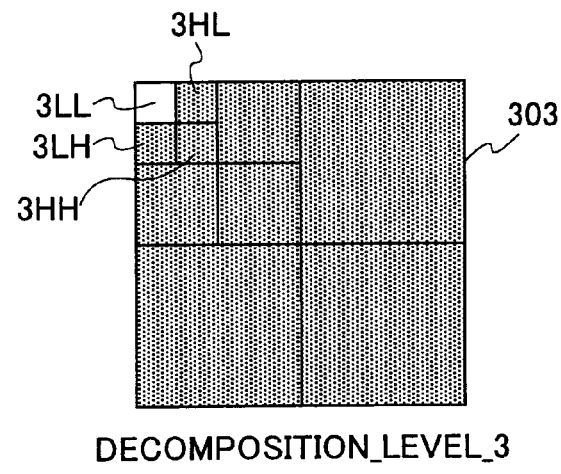

FIG. 15 is a schematic diagram showing an example of divided components of an original image that is a color image. As shown in FIG. 15, generally, in a color image, an original image is divided into the components R, G, and B according to the RGB primary color system, for example. Each of the components R, G, and B of the original image is further divided into tiles 201, 202, and 203 that are rectangular regions, respectively. Each of the tiles 201, 202, and 203, respectively comprising, for example, R00, R01, ..., R15/G00, G01, ..., G15/B00, B01, ..., B15, constructs a basic unit in carrying out a compression/decompression process. Accordingly, a compression/decompression operation is independently performed on each of the components R, G, and B, and each of the tiles 201, 202, and 203.

When coding image data, the data of each of the tiles 201, 202, and 203 are input to the color space conversion/inverse conversion part 111 shown in FIG. 14 and subjected to color space conversion. Then, two-dimensional wavelet transformation (forward transformation) is applied to the data by the two-dimensional wavelet transformation/inverse transformation part 112, and thus the data are spatially divided into frequency bands.

FIGS. 16A through 16D are schematic diagrams showing subbands at respective decomposition levels when the number of the decomposition levels is three. The two-dimensional wavelet transformation/inverse transformation part 112 performs two-dimensional wavelet transformation on a tile original image 300 (0LL) (decomposition level 0) obtained by dividing the original image into tiles, so as to divide the tile original image into subbands (1LL, 1HL, 1LH, and 1HH) shown in decomposition level 1 (301) in FIG. 16B. Then, successively, the two-dimensional wavelet transformation/inverse transformation part 112 performs two-dimensional wavelet transformation on the low frequency component 1LL in the layer so as to divide the component into subbands (2LL, 2HL, 2LH, and 2HH) shown in the decomposition level 2 (302) in FIG. 16C. Similarly, the two-dimensional wavelet transformation/inverse transformation part 112 successively performs two-dimensional wavelet transformation also on the low frequency component 2LL so as to divide the component into subbands (3LL, 3HL, 3LH, and 3HH) shown in the decomposition level 3 (303) in FIG. 16D. In FIGS. 16A through 16D, the subbands to be coded in the respective decomposition levels are colored gray. For example, when the number of the decomposition levels is three, the gray-colored subbands (3HL, 3LH, 3HH, 2HL, 2LH, 2HH, 1HL, 1LH, and 1HH) are to be coded, and the subband 3LL is not coded.

Then, after bits to be coded are determined in the specified order of coding, the quantization/inverse quantization part 113 generates a context from bits in the vicinity of the bits to be coded.

FIG. 17 is a schematic diagram showing an example of precincts. The wavelet coefficients after the process of quantization are divided into rectangular shapes called "precincts" that do not overlap each other in each subband. This is introduced to effectively use memory in implementation. As shown in FIG. 17, one precinct is formed by three rectangular regions that spatially match. In addition, each precinct is divided into rectangular "code blocks" that do not overlap each other. This becomes the basic unit when performing entropy coding.

FIGS. 18A, 18B, 18C, and 18D are schematic diagrams showing the outline of the process of decomposing the values of two-dimensional wavelet coefficients after two-dimensional wavelet transformation into "bit-planes" and placing in order the "bit-planes" for each pixel or code block. The coefficient values after wavelet transformation may be directly quantized and coded. In JPEG 2000, however, in order to increase the efficiency of coding, the coefficient values can be decomposed into the "bit-planes", and the "bit-planes" can be placed in order for each pixel or code block. FIGS. 18A through 18D show this procedure in brief. In FIGS. 18A through 18D, an example is shown where an original image (32×32 pixels) is divided into four tiles, each having 16×16 pixels. The sizes of the precinct and the code block at the decomposition level 1 are 8×8 pixels and 4×4 pixels, respectively. The numbers of the precincts and the code blocks are assigned in raster order. The mirroring method is used for pixel extension with respect to pixels outside the boundaries of the tiles so as to perform wavelet transformation using a reversible filter (5, 3) and obtain the wavelet coefficient values at the decomposition level 1.

Figure 18A:
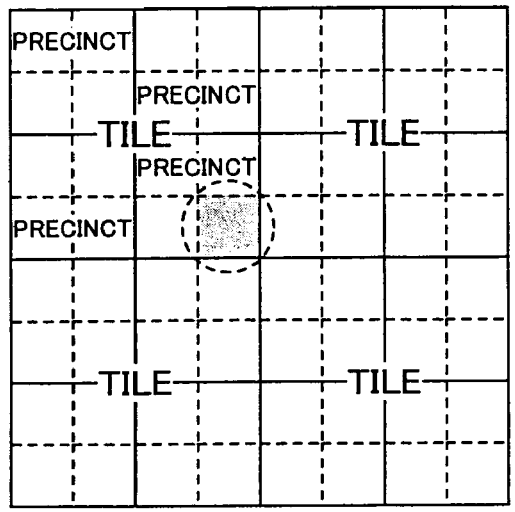
FIGS. 18A, 18B, 18C, and 18D are schematic diagrams showing the outline of a process of decomposing the values of two-dimensional wavelet coefficients after two-dimensional wavelet transformation into "bit-planes" and placing the "bit-planes" in order for each pixel or code block.
Figure 18B:
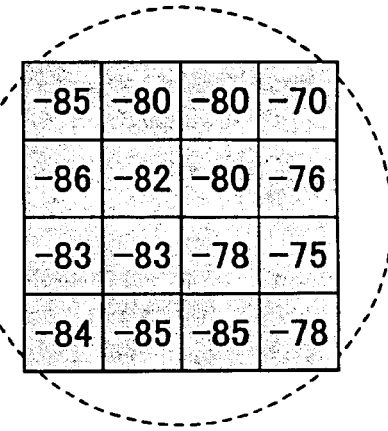
Figure 18C:
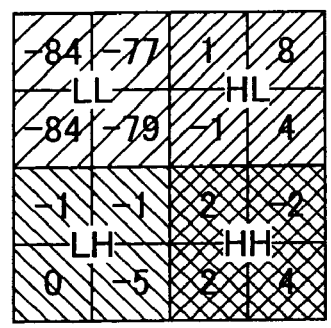
Figure 18D:
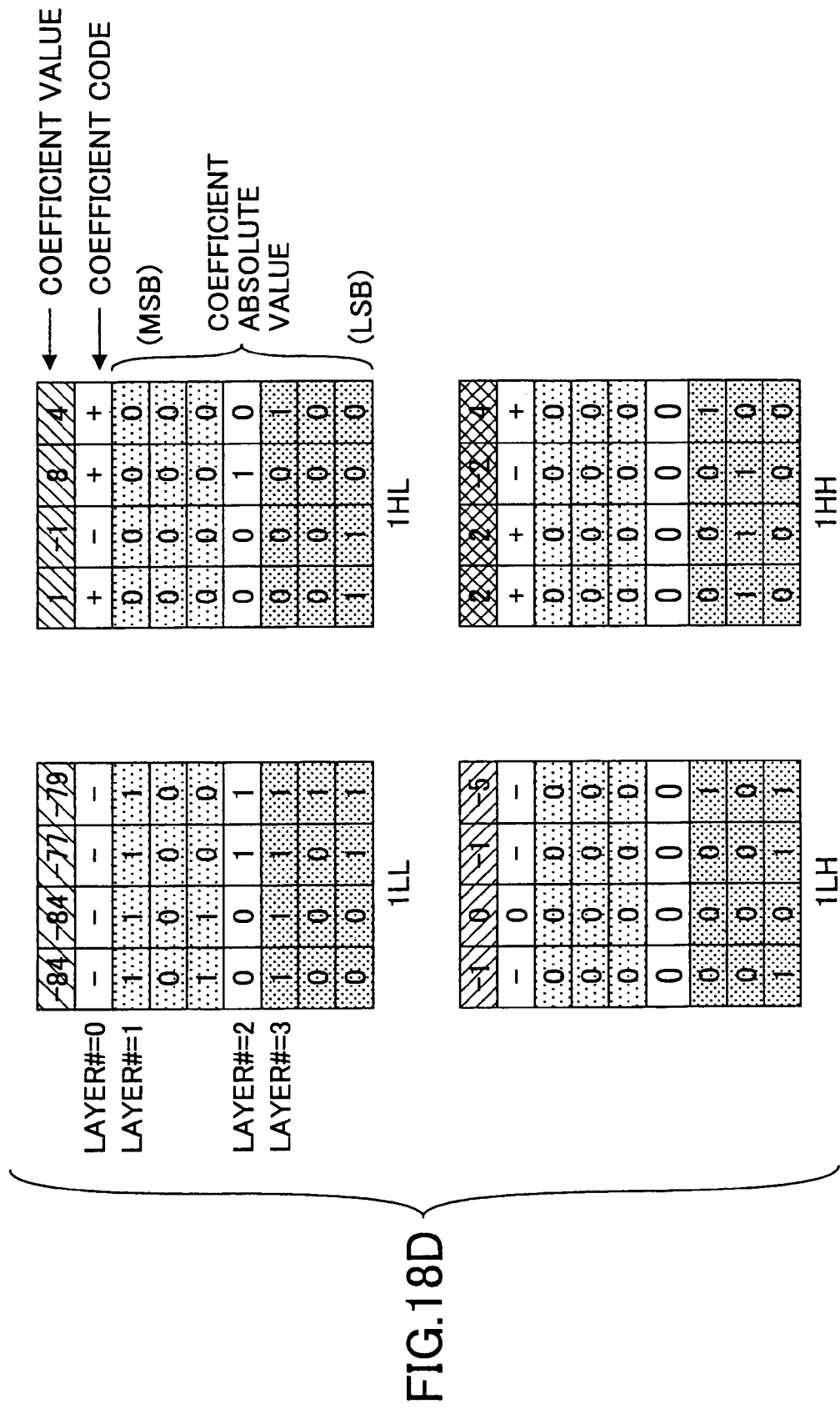

In addition, FIG. 18D is a schematic diagram conceptualizing typical "layers" of tile 0/precinct 3/code block 3. The constructions of the layers are easy to understand when the wavelet coefficient values are seen from the lateral direction (bit-plane direction). One layer is constructed by an arbitrary number of bit-planes. In this example, layers 0, 1, 2, and 3 are each formed by three bit-planes 1, 3 and 1. The closer to the LSB the bit-plane included in the layer is, the sooner the layer is quantized. Conversely, the layer close to the MSB is left unquantized to the end. The method of destroying (eliminating bits) from the layers close to the LSB is called truncation and is capable of finely controlling the quantization rate.

Figure 19:
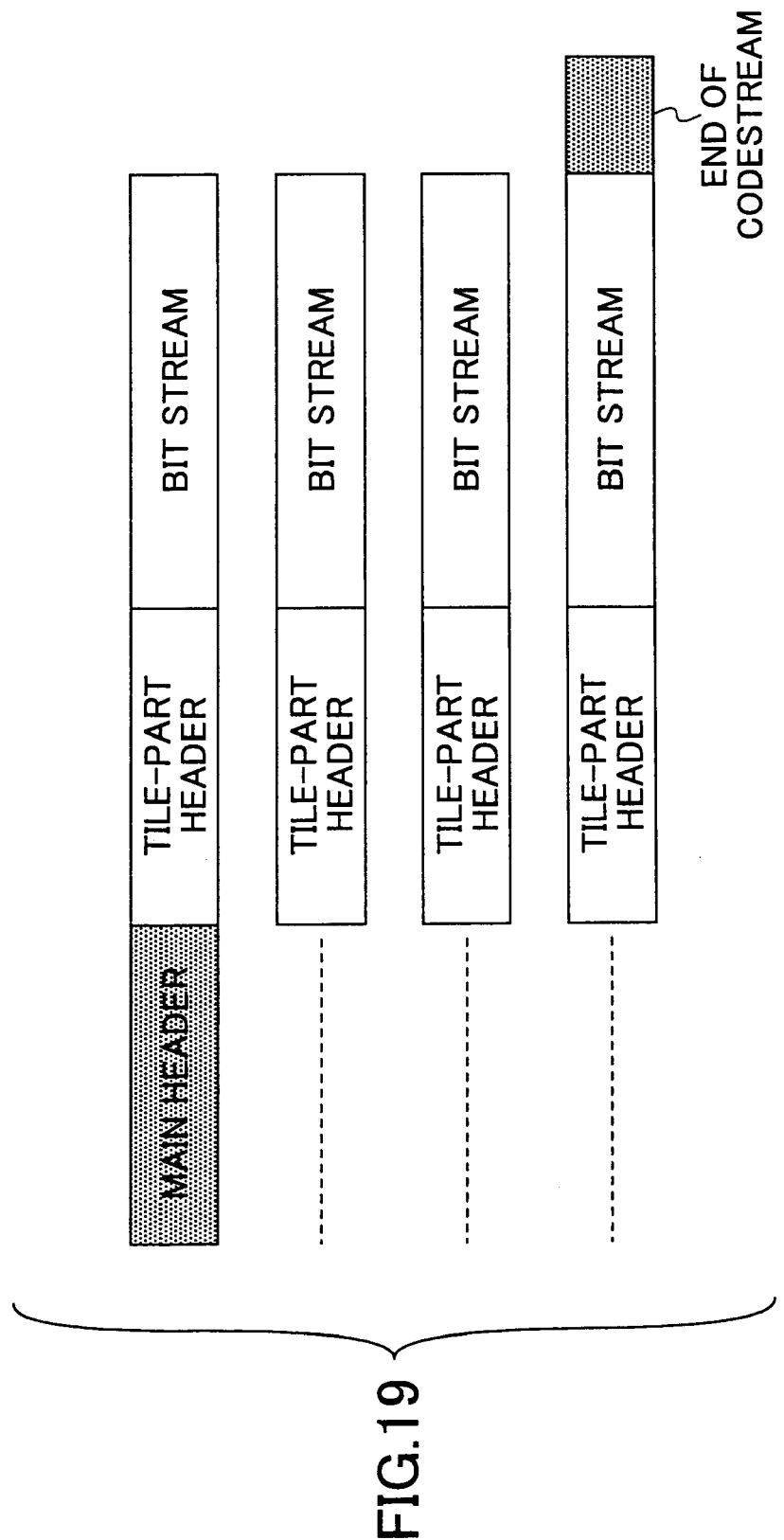
FIG. 19 is a schematic diagram showing an example of a codestream of coded image data.

Next, referring to FIG. 19, a description will be given of the entropy coder/decoder 114. FIG. 19 is a schematic diagram showing a codestream of coded image data. The entropy coder/decoder 114 (refer to FIG. 14) performs coding on the tiles 201, 202, and 203 of the components R, G, and B, respectively, by probability estimation using the context and the bits to be coded. As described above, the coding process is performed on all components R. G, and B of the original image by units of the tiles 201, 202, and 203.

Next, a description will be given of the tag processing part 115. The tag processing part 115 combines all coded data from the entropy coder/decoder 114 into one codestream and also adds tags to the codestream. FIG. 19 briefly shows the construction of the codestream. Tag information called "header" is added to the head of such codestream and the heads of tile parts forming the tiles 201, 202 and 203. The coded data of each of the tiles 201, 202 and 203 follows the tag information. The tag is placed again at the end of the codestream.

On the other hand, in decoding, contrary to the coding, image data are generated from the codestream of the tiles 201, 202 and 203 of the respective components R, G and B. A description will be given of such a process, by using FIG. 14. The tag processing part 115 interprets the tag information added to the codestream that is input externally, decomposes the codestream into codestreams of the tiles 201, 202 and 203 of the respective components R, G and B, and performs a decoding process on each of the codestreams of the tiles 201, 202 and 203 of the respective components R, G and B. On this occasion, the positions of bits to be decoded is determined in the order based on the tag information in the codestream, and the quantization/inverse quantization part 113 generates a context from bits (already coded) in the vicinity of the bits to be decoded. Then, the entropy coder/decoder 114 generates the target bits by performing decoding through probability estimation using the contexts and codestream, and writes the target bits at the positions of the target bits. Since the data thus decoded are spatially divided for each frequency band, by performing two-dimensional wavelet inverse transformation on the decoded data by the two-dimensional wavelet transformation/inverse transformation part 112, the tiles 201, 202 and 203 in the respective components R, G and B in the image data are restored. The restored data are converted into data of the original color system by the color space conversion/inverse conversion part 111.

(Determination of Vertical Writing/Horizontal Writing)

This embodiment includes a vertical writing/horizontal writing determination function of determining whether a text image, which is the original of image data, is of vertical writing or horizontal writing based on the characteristics of coefficients of vertical direction or horizontal direction included in the two-dimensional wavelet coefficients that are generated by two-dimensional wavelet transformation by the two-dimensional wavelet transformation/inverse transformation part 112. Referring to FIG. 20A through 25, a description will be given of such vertical writing/horizontal writing determination function.

Figure 20A:
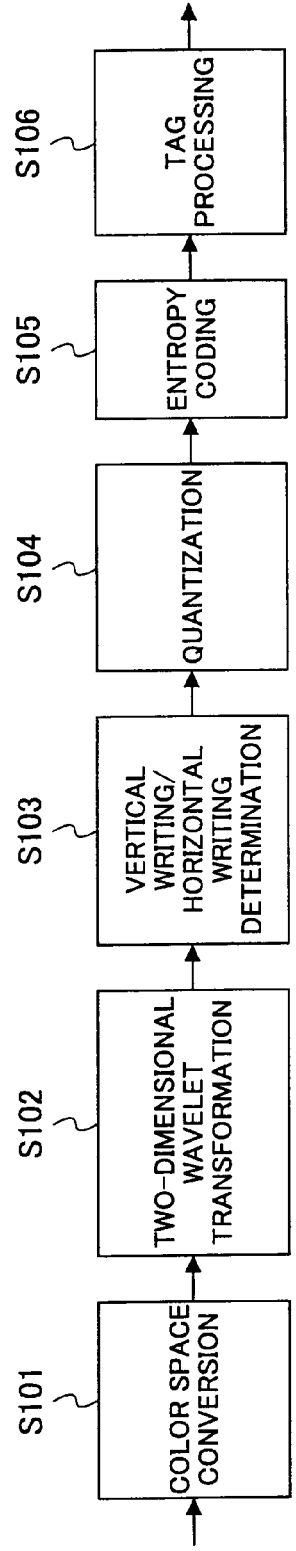
FIG. 20A is a flow chart for explaining a compression process of image data.
Figure 20B:
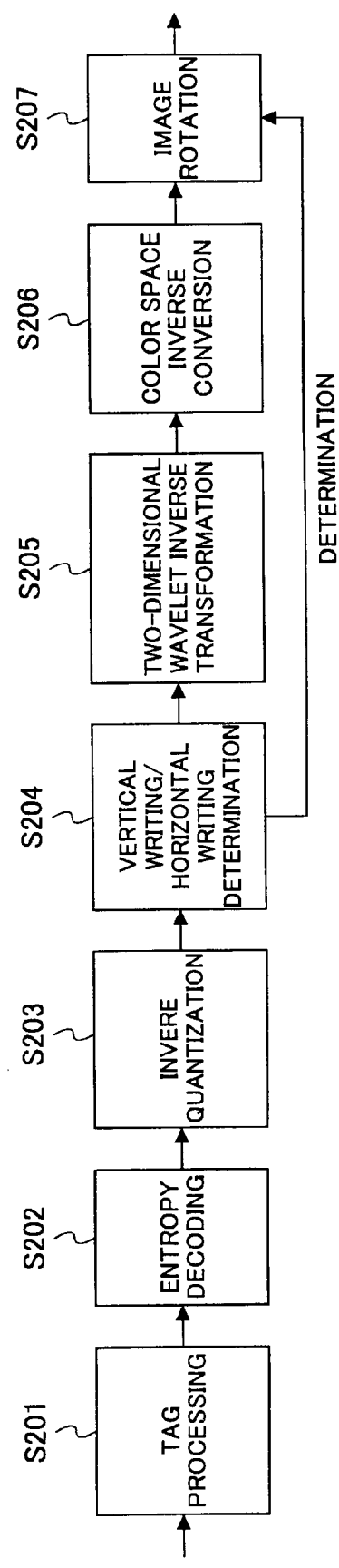
FIG. 20B is a flow chart for explaining a decompression process of compressed image data.

FIG. 20A is a flow chart showing a compression process of image data, and FIG. 20B is a flow chart showing a decompression method of the compressed image data.

As shown in FIG. 20A, in the compression process of image data, the color space conversion/inverse conversion part 111 performs color space conversion, that is, the process of dividing the image data into the components of R, G and B (refer to FIG. 14) in step S101. Thereafter, in step S102, the two-dimensional wavelet transformation/inverse transformation part 112 performs a two-dimensional wavelet transformation process on a plurality of numbers of tiles 201, 202 and 203 (refer to FIG. 14) that construct the respective components R, G and B, so as to calculate two-dimensional wavelet coefficients with respect to the tiles 201, 202 and 203. The coefficients include coefficients of vertical direction or horizontal direction, and it is possible to determine whether a text image is of vertical writing or horizontal writing from the characteristics of the coefficients. Thus, subsequently, in step S103, the vertical writing/horizontal writing determination process is performed as a determination step. The process is performed by a computer such that the image processing program for compressing/decompressing image data according to the JPEG 2000 method is interpreted/carried out by the computer. Here, in this embodiment, determination means and the determination function are achieved as one of means of and one of functions carried out by a computer, respectively. The decision result obtained by the determination means and by carrying out the determination function is temporarily stored in a storage area of a computer.

Then, in step S104, the two-dimensional wavelet coefficients based on the original image are quantized by the quantization/inverse quantization part 113 and coded by the entropy coder/decoder 114 in step S105 so as to form the bit streams as shown in FIG. 19. Then, in step S106, the tag processing part 115 adds tags to such bit streams, and the compression process of the image data is completed.

As shown in FIG. 20A, in the decompression process of the compressed image data, in step S201, the tag processing part 115 analyzes the codes in the bit streams as shown in FIG. 19. In step S202, the bit streams are converted into quantized wavelet coefficients by the entropy coder/decoder 114. The quantization/inverse quantization part 113 obtains the wavelet coefficients in step S203. In step S204, the vertical writing/horizontal writing determination of the compressed image data is made by using the inversely quantized wavelet coefficients. The process is performed by a computer such that the image processing program for compressing/decompressing image data according to the JPEG 2000 method is interpreted/carried out by the computer. Here, in this embodiment, the determination means and the determination function are achieved as one of means of and one of functions carried out by a computer, respectively. The decision result obtained by carrying out such determination function or by determination means is temporarily stored in a storage area of a computer.

Then, in step S205, the wavelet coefficients are converted into Y, CB and CR signals by the two-dimensional wavelet transformation/inverse transformation part 112 and then converted into RGB signals by the color space conversion/inverse conversion part 111 in step S206. In step S207, a process of rotating the image to the correct angle by using the result of the vertical writing/horizontal writing determination obtained in step S204. Such a process of rotating the image is performed by a computer such that the image processing program for compressing/decompressing image data according to the JPEG 2000 method is interpreted/carried out by the computer. Here, in this embodiment, the rotating means and the rotation function are achieved as one of means of and one of functions carried out by a computer, respectively. Generally, there are high needs for inputting a plurality of documents at a time and displaying them afterwards. In such a case, if the angles of the documents are automatically corrected, it is effective since a user can save the trouble of correcting the angles of images one by one.

Figure 21:
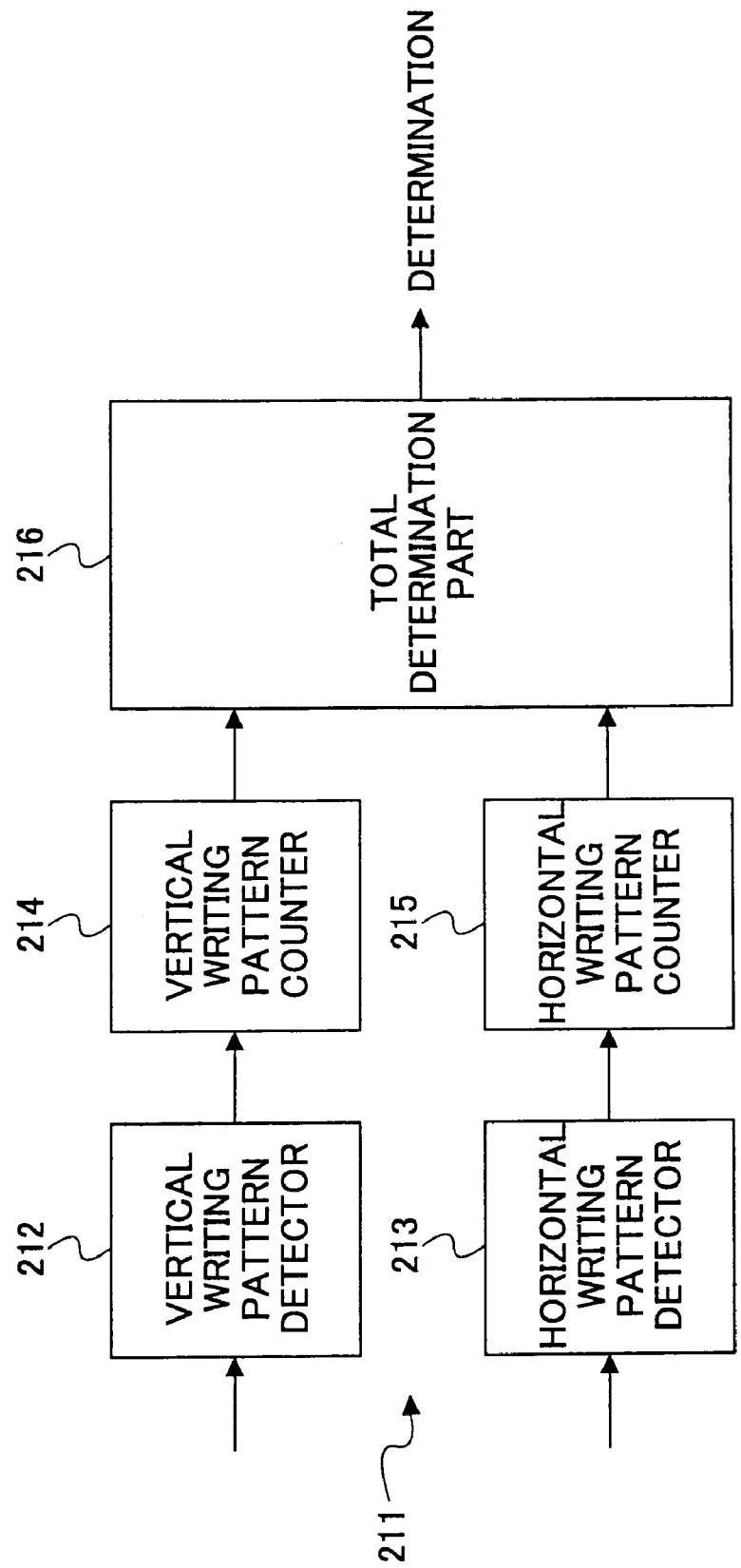
FIG. 21 is a block diagram showing a vertical writing/horizontal writing determination part.

FIG. 21 is a block diagram of a vertical writing/horizontal writing part 211 as the determination means that performs the vertical writing/horizontal writing determination in steps 103 and 204. The block diagram shows, in a blocked manner, an algorithm corresponding to the vertical writing/horizontal writing determination means of and the vertical writing/horizontal writing determination function performed by a computer in accordance with the image processing program for compressing/decompressing image data according to the JPEG 2000 method.

The vertical writing/horizontal writing determination part 211 includes a vertical writing pattern detector 212, a horizontal writing pattern detector 213, a vertical writing pattern counter 214, and a horizontal writing pattern counter 215. The two-dimensional wavelet transformed two-dimensional wavelet coefficients are input to the vertical writing pattern detector 212 and the horizontal writing pattern detector 213. The data output from the vertical writing pattern detector 212 and the horizontal writing pattern detector 213 are input to the vertical writing pattern counter 214 and the horizontal writing pattern counter 215, respectively. In addition, the vertical writing/horizontal writing determination part 211 also includes a total determination part 216. The output results from the vertical writing pattern counter 214 and the horizontal writing pattern counter 215 are input to the total determination part 216.

Under such a construction, the vertical writing/horizontal writing determination part 211 detects vertical writing patterns by the vertical writing pattern detector 212 and counts the vertical writing patterns by the vertical writing pattern counter 214, and detects horizontal writing patterns by the horizontal writing pattern detector 213 and counts the horizontal writing patterns by the horizontal writing pattern counter 215. In other words, the detection of the vertical writing patterns by the vertical writing pattern detector 212 is performed by detecting edge components of vertical components included in the two-dimensional wavelet coefficients. The counting of the vertical writing patterns by the vertical writing pattern counter 214 is performed by counting the detected number of such edge components. Similarly, the detection of the horizontal writing patterns by the horizontal writing pattern detector 213 is performed by detecting edge components of horizontal components included in the two-dimensional wavelet coefficients. The counting of the horizontal writing patterns by the horizontal writing pattern counter 215 is performed by counting the detected number of such edge components. When the number of the vertical writing patterns is greater than a predetermined value, ten, for example, it is determined by the total determination part 216 that an image is of vertical writing. When the number of the horizontal writing patterns is greater than a predetermined value, ten, for example, it is determined by the total determination part 216 that an image is of horizontal writing. When the numbers of the vertical writing patterns and the horizontal writing patters are both greater or both less than the respective predetermined values, the decision cannot be made.

Figure 22:
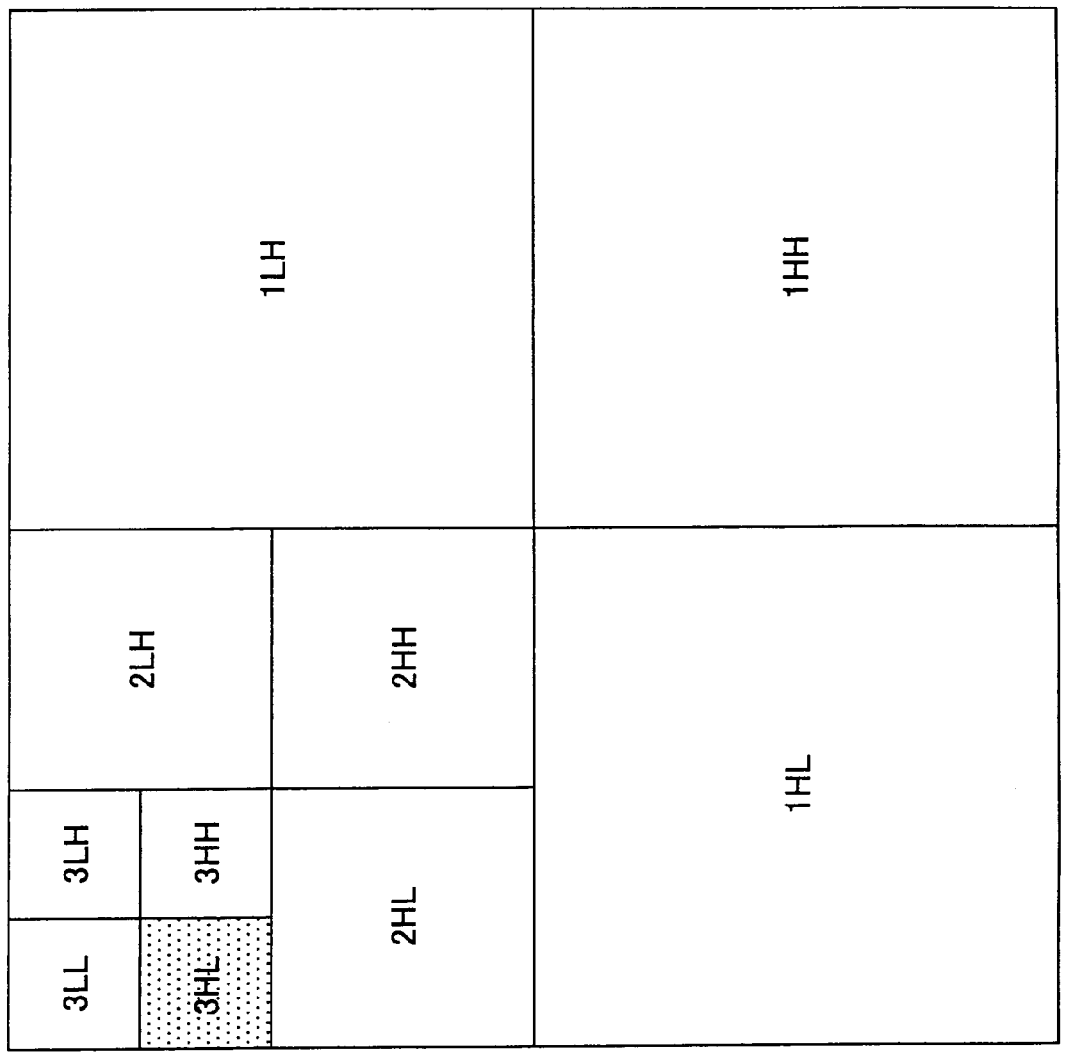
FIG. 22 is a schematic diagram showing an example of a subband used for vertical writing determination.

FIG. 22 is a schematic diagram showing the subbands used for vertical writing determination in the vertical writing/horizontal writing determination part 211. In this embodiment, the number of layers of the hierarchy of the two-dimensional wavelet coefficients obtained by two-dimensional wavelet transformation, that is, the decomposition level, is three. In this case, the coefficient that allows good extraction of edge components in the vertical direction is the coefficient of the subband HL in the third layer, that is, the 3HL coefficient. Thus, the vertical writing/horizontal writing determination part 211 first determines whether or not a text image is of vertical writing by using the 3HL coefficient. When the determination cannot be made, the vertical writing determination is successively repeated for 2HL and 1HL. That is, the vertical writing/horizontal writing determination part 211 determines whether or not a text image, which is the original of image data, is of vertical writing by using the coefficient value in the third layer, which is the top layer in the three-layer hierarchy. When the determination cannot be made, the coefficient values in the second and first layers, which are lower layers, are successively used for the determination. Hence, it is possible to obtain reliability of the determination.

Figure 23:
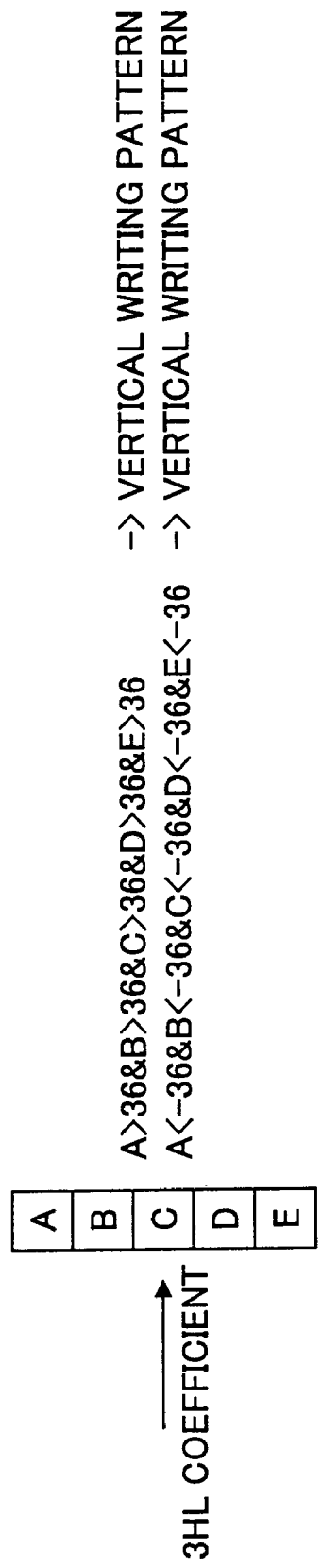
FIG. 23 is a schematic diagram showing an example of an algorithm in a vertical writing pattern determination part.

FIG. 23 is a schematic diagram showing an example of the algorithm in the vertical writing pattern determination part of the vertical writing/horizontal writing determination part 211. The vertical writing/horizontal writing determination part 211 refers to five continuous coefficients in the vertical direction using the 3HL coefficients. When all the values are greater than 36 or less than −36, it is determined to be the vertical writing pattern. Here, 36 is an example of values with which edges can be identified. The value is not limited to 36 and may be any value, provided that edges can be identified in accordance with images. Additionally, in the above description, the number of the coefficients is five. Five is taken as an example of values with which vertical writing can be identified. The value is not limited to five and may be any value, provided that the value allows identification of vertical writing in accordance with images.

Figure 24:
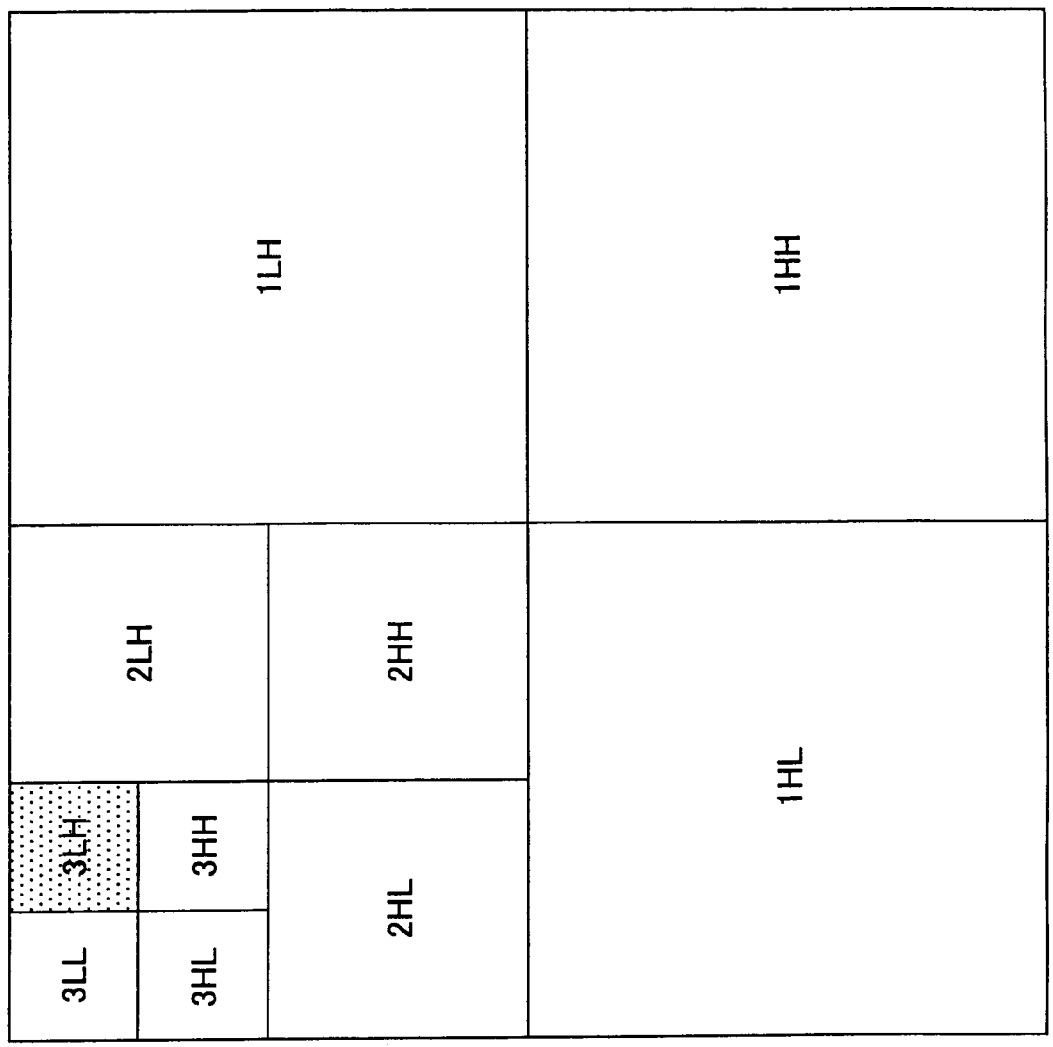
FIG. 24 is a schematic diagram showing an example of a subband used for horizontal writing determination.

FIG. 24 is a schematic diagram showing an example of subbands used for horizontal writing. In this embodiment, the number of layers in the hierarchy of the two-dimensional coefficients obtained by two-dimensional wavelet transformation, that is, the decomposition level, is three. In this case, the coefficient that allows good extraction of edge components in the lateral direction is the coefficient of the subband LH in the third layer, that is, the 3LH coefficient. Thus, the vertical writing/horizontal writing determination part 211 first determines whether or not a text image is of horizontal writing by using the 3LH coefficient. When the determination cannot be made, the horizontal writing determination is successively repeated for 2LH and 1LH. That is, the vertical writing/horizontal writing determination part 211 determines whether or not a text image, which is the original of image data, is of horizontal writing by using the coefficient value in the third layer, which is the top layer in the three-layer hierarchy. When the determination cannot be made, the coefficient values in the second and first layers, which are the lower layers, are successively used for the determination. Hence, it is possible to obtain reliability of the determination.

Figure 25:
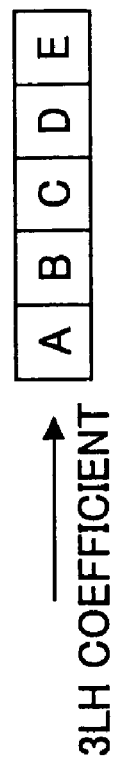
FIG. 25 is a schematic diagram showing an example of algorithm in a horizontal writing.

FIG. 25 is a schematic diagram showing an example of the algorithm in the horizontal writing pattern determination part of the vertical writing/horizontal writing determination part 211. The vertical writing/horizontal writing determination part 211 refers to continuous five coefficients in the horizontal direction using the 3LH coefficient. When all of the coefficients are greater than 36 or less than −36, it is determined to be a horizontal pattern. Here, 36 is an example of values with which edges can be identified. The value is not limited to 36 and may be any value, provided that edges can be identified in accordance with images. Additionally, in the above description, the number of the coefficients is five. Five is taken as an example of values with which horizontal writing can be identified. The value is not limited to five and may be any value, provided that the value allows identification of horizontal writing in accordance with images.

According to this embodiment, by the above-described process, it is possible to determine whether a text image included in image data is of vertical writing or horizontal writing without adding a heavy function in a compression/decompression process of the image data.

The present invention is not limited to the specifically disclosed embodiments, and variations and modifications may be made without departing from the scope of the present invention.

The present application is based on Japanese priority applications No. 2002-108019 filed on Apr. 10, 2002 and No. 2002-199761 filed on Jul. 9, 2002, the entire contents of which are hereby incorporated by reference.

The invention of claimed is:

1. An image processing apparatus, comprising:
a transform unit configured to wavelet-transform image data into a set of wavelet coefficients; and
a determination unit configured to determine whether the image data is of a vertical writing or of a horizontal writing based on the set of wavelet coefficients,
wherein the determination unit includes
a vertical detection unit configured to detect vertical writing patterns by detecting edge components of a vertical component included in the wavelet coefficients;
a vertical count unit configured to count the vertical writing patterns by counting the edge components of the vertical component detected by the vertical detection unit;
a horizontal detection unit configured to detect horizontal writing patterns by detecting edge components of a horizontal component included in the wavelet coefficients;
a horizontal count unit configured to count the horizontal writing patterns by counting the edge components of the horizontal component detected by the horizontal detection unit; and
a vertical/horizontal determination unit configured to determine whether the image data is of the vertical writing or of the horizontal writing based on counts of the vertical count unit and the horizontal count unit.

2. The image processing apparatus as claimed in claim 1, further comprising an image rotation unit configured to rotate the image data in accordance with the determination made by the determination unit.

3. An image processing apparatus, comprising:
a transform unit configured to wavelet-transform image data into a set of wavelet coefficients; and
a determination unit configured to determine whether the image data is of a vertical writing or of a horizontal writing based on the set of wavelet coefficients, wherein the set of wavelet coefficients comprises "n" layers, and the determination unit determines whether the image data is of the vertical writing or of the horizontal writing using upper ones of the "n" layers and, if the determination of whether the image data is of the vertical writing or of the horizontal writing can not be made using the upper ones of the "n" layers, the determination unit uses lower ones of the "n" layers in turn.

4. A method of processing image data, the method comprising:
- wavelet-transforming image data into a set of wavelet coefficients; and
- determining whether the image data is of a vertical writing or of a horizontal writing based on the set of wavelet coefficients,
- wherein the determining comprises
  - detecting vertical writing patterns by detecting edge components of a vertical component included in the wavelet coefficients;
  - counting the vertical writing patterns by counting the edge components of the vertical component detected;
  - detecting horizontal writing patterns by detecting edge components of a horizontal component included in the wavelet coefficients;
  - counting the horizontal writing patterns by counting the edge components of the horizontal component detected; and
  - determining whether the image data is of the vertical writing or of the horizontal writing based on counts of the vertical writing patterns and the horizontal writing patterns.

5. The method as claimed in claim 4, further comprising rotating the image data in accordance with the determination made of whether the image data is of the vertical writing or of the horizontal writing.

6. A method of processing image data, the method comprising:
- wavelet-transforming image data into a set of wavelet coefficients; and
- determining whether the image data is of a vertical writing or of a horizontal writing based on the set of wavelet coefficients,
- wherein the set of wavelet coefficients comprises "n" layers, and the determination of whether the image data is of the vertical writing or of the horizontal writing is made using upper ones of the "n" layers and, if the determination of whether the image data is of the vertical writing or of the horizontal writing cannot be made using the upper ones of the "n" layers, lower ones of the "n" layers are used in turn.

* * * * *